United States Patent
Noess

(10) Patent No.: US 11,029,690 B2
(45) Date of Patent: *Jun. 8, 2021

(54) STEERING CONTROLLER FOR AN AUTONOMOUS VEHICLE WITH STABILITY REGULATION

(71) Applicant: AGCO International GmbH, Neuhausen (CH)

(72) Inventor: Christian Noess, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 169 days.

This patent is subject to a terminal disclaimer.

(21) Appl. No.: 16/248,830

(22) Filed: Jan. 16, 2019

(65) Prior Publication Data

US 2019/0220024 A1 Jul. 18, 2019

Related U.S. Application Data

(60) Provisional application No. 62/618,203, filed on Jan. 17, 2018.

(51) Int. Cl.
*G05D 1/02* (2020.01)
*G05D 1/00* (2006.01)
(Continued)

(52) U.S. Cl.
CPC .......... *G05D 1/0212* (2013.01); *A01B 69/008* (2013.01); *B62D 1/283* (2013.01);
(Continued)

(58) Field of Classification Search
CPC .. G05D 1/0212; G05D 1/0088; G05D 1/0223; G05D 1/0276; G05D 2201/0201;
(Continued)

(56) References Cited

U.S. PATENT DOCUMENTS

2017/0357262 A1 12/2017 Dix et al.
2019/0220023 A1* 7/2019 Noess .................. B62D 11/003

FOREIGN PATENT DOCUMENTS

WO 2016/178294 A1 11/2016

OTHER PUBLICATIONS

European Patent Office, Search Report for related EP Application No. EP 19 15 2311, dated Jun. 7, 2019.
(Continued)

*Primary Examiner* — Gertrude Arthur Jeanglaude

(57) ABSTRACT

A mobile machine including a chassis, a plurality of ground-engaging elements, actuators for driving movement of the ground-engaging elements and a controller for controlling each of the actuators to cause the mobile machine to follow a reference path. The controller is configured to implement a cascading control loop for controlling movement of the mobile machine, the cascading control loop including an outer loop and an inner loop. The outer loop is configured to determine a set heading for reducing a distance between the mobile machine and the reference path, the set heading being determined using an error slope parameter. The inner loop is configured to drive the actuators so that the mobile machine follows the set heading determined by the outer loop. The controller is configured to automatically adjust the error slope value so that the rate of change of the set heading does not exceed a maximum yaw rate.

5 Claims, 18 Drawing Sheets

(51) Int. Cl.
  *B62D 1/28* (2006.01)
  *B62D 11/00* (2006.01)
  *B62D 15/02* (2006.01)
  *A01B 69/04* (2006.01)
  *G06F 16/29* (2019.01)
  *B62D 11/04* (2006.01)

(52) U.S. Cl.
  CPC ............ *B62D 11/003* (2013.01); *B62D 11/04* (2013.01); *B62D 15/025* (2013.01); *G05D 1/0088* (2013.01); *G05D 1/0223* (2013.01); *G05D 1/0276* (2013.01); *G06F 16/29* (2019.01); *G05D 2201/0201* (2013.01)

(58) Field of Classification Search
  CPC ....... G06F 16/29; A01B 69/008; B62D 1/283; B62D 11/003; B62D 11/04; B62D 15/025
  USPC .......................................................... 701/23
  See application file for complete search history.

(56) References Cited

OTHER PUBLICATIONS

Liu Y et al, "Omni-directional mobile robot controller based on trajectory linearization", Robotics and Autonomous Systems, Elsevier Science Publishers, Amsterdam, NL, vol. 56, No. 5, May 31, 2008 (May 31, 2008), pp. 461-479, XP022614331, ISSN: 0921-8890, DOI: 10.1016/J.ROBOT.2007.08.007.

Kumbasar Tufan et al, Big Bang-Big Crunch optimization based interval type-2 fuzzy PID cascade controller design stra, Information Sciences, Amsterdam, NL, vol. 282, Jun. 14, 2014 (Jun. 14, 2014), pp. 277-295, XP029010351,ISSN: 0020-0255, DOI:10.1016/J.INS.2014.06.005.

* cited by examiner

STEERING CONTROLLER FOR AN AUTONOMOUS VEHICLE WITH STABILITY REGULATION

RELATED APPLICATIONS

The present application claims priority under 35 U.S.C. § 119 to U.S. Provisional Application Ser. No. 62/618,203, filed Jan. 17, 2018. The full disclosure, in its entirety, of U.S. Provisional Application Ser. No. 62/618,203 is hereby incorporated by reference.

FIELD

Embodiments of the present invention relate to control systems for autonomous machines. More particularly, embodiments of the present invention relate to navigational control systems for enabling autonomous machines to follow guidance paths.

BACKGROUND

Machinery and processes used in the agriculture industry continue to evolve with advancements in technology. Computer technology and Global Navigation Satellite Systems (GNSS), for example, have enabled the use of automated guidance on some agricultural machines. Automated guidance enables a machine to automatically follow a designated path without operator control or input and has improved the efficiency of agricultural operations not only by enabling more precise operation (e.g., less overlap and fewer missed areas), but also by allowing the operator to focus on other areas of the machine's operation, such as user-defined settings that can affect performance and efficiency.

Another technology that is increasingly of interest within the agriculture industry is full machine automation. A machine that is fully automated may be operated without any user input or control and, therefore, may be designed without an operator seat or cabin. Eliminating operator space renders machine design more flexible. A machine with no operator space, for example, may be smaller and simpler than a manned machine. However, the automated control of such machines must be even more robust than automated guidance on manned machines as there is no operator oversight to handle anomalies in operation or to make corrections.

The above section provides background information related to the present disclosure which is not necessarily prior art.

SUMMARY

A mobile machine according to an embodiment of the invention comprises a chassis, a plurality of ground-engaging elements for supporting the chassis on a ground surface and propelling the chassis relative to the ground surface, each of the plurality of ground-engaging elements being at a fixed angle relative to the chassis, a plurality of actuators for driving movement of the ground-engaging elements, each of the actuators being configured to drive movement of at least one of the ground-engaging elements independently of the other ground-engaging elements, and a controller for controlling each of the actuators to cause the mobile machine to follow a reference path. The controller is configured to implement a cascading control loop for controlling movement of the mobile machine, the cascading control loop including an outer loop configured to determine a set heading for reducing a distance between the mobile machine and the reference path, the set heading being determined using an error slope parameter, and an inner loop configured to drive the actuators so that the mobile machine follows the set heading determined by the outer loop. The controller is further configured to automatically adjust the error slope value so that the rate of change of the set heading does not exceed the mobile machine's maximum yaw rate.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein.

Figure 1:
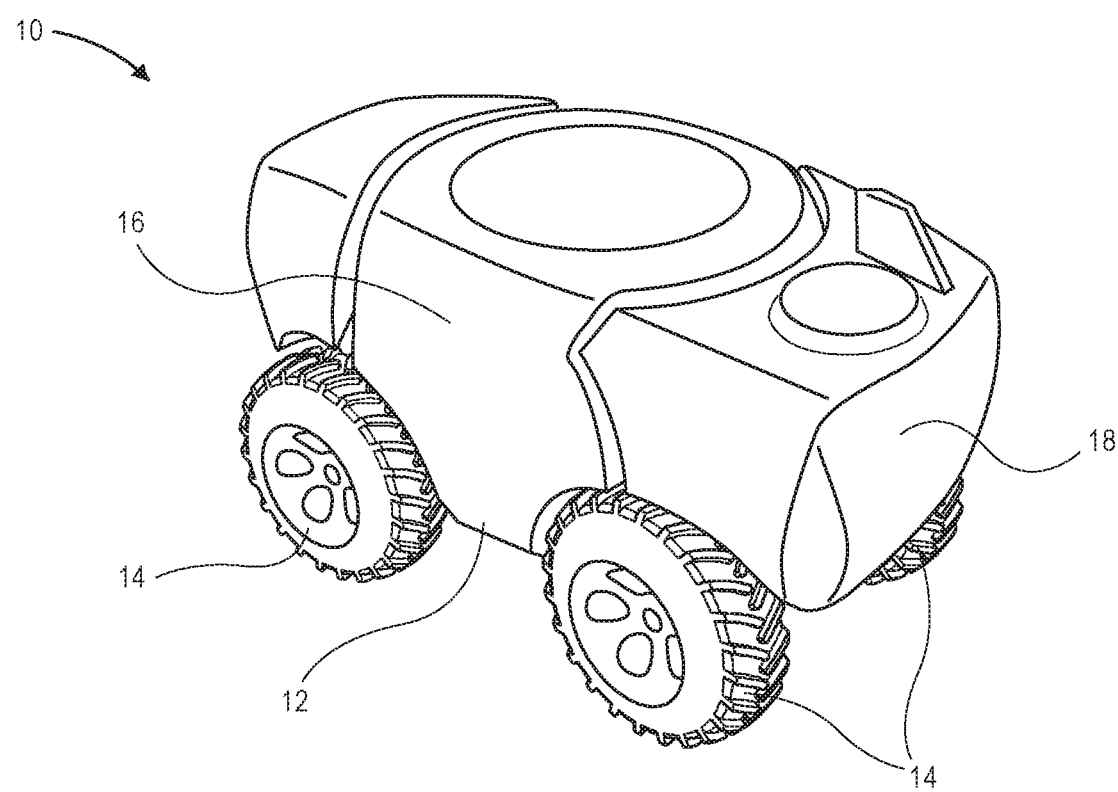
FIG. 1 is a perspective view of an autonomous mobile machine constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Turning now to the drawing figures, and initially FIG. 1, an exemplary mobile machine 10 constructed in accordance with embodiments of the invention is illustrated. The machine 10 is an autonomous vehicle configured to perform an agricultural operation such as planting seeds. The machine 10 includes a chassis 12, four wheels 14, a product holding and distribution system 16, and a communications and control system 18. The four wheels 14 are configured to support the chassis 12 on a ground surface and propel the machine 10 along the ground surface. Two or more of the wheels 14 are driven to propel the machine 10 and each of the wheels 14 is at a fixed angle relative to the chassis 12. In other words, none of the wheels 14 is configured to pivot from side to side to steer the machine 10. Rather, the communications and control system 18 steers the machine 10 by rotating driven wheels on different sides of the machine 10 at different rates—a so-called "skid steer" system. The product holding and distribution system 16 includes a tank (not shown) for holding seeds to be planted in a field. An applicator (not shown) for applying or distributing the product includes a mechanism for placing seed in the ground.

Figure 2:
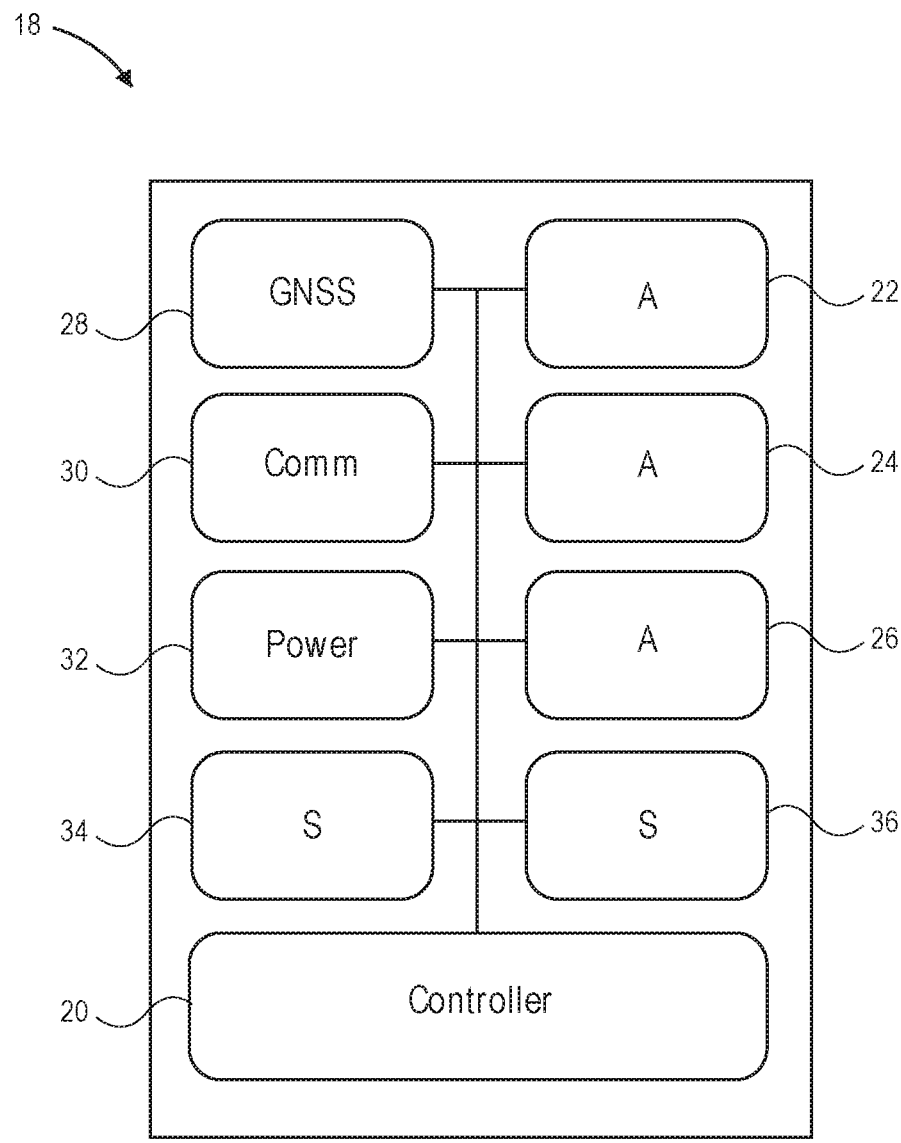
FIG. 2 is a block diagram of various components of a communication and control system of the mobile machine of FIG. 1.

A block diagram depicting various components of the communications and control system 18 is depicted in FIG. 2 and includes a controller 20, two actuators 22, 24 for driving two or more of the wheels 14, an actuator 26 for operating the product holding and distribution system 16, a positioning component 28, a communications component 30, a power source 32, and two or more sensors 34, 36. The actuators 22, 24 for driving the wheels 14 include electric motors with each electric motor driving one of the rear wheels 14. Each of the actuators 22, 24 is driven independently of the other such that the wheels 14 may be operated at different rotational speeds to thereby steer the machine 10. The positioning component 28 uses a global navigation satellite system (GNSS) or similar technology to determine a geographic position of the machine 10. The geographic position of the machine 10 may be used, for example, to navigate the machine 10 according to a guidance path and to generate a work record. The communications component 30 enables the machine 10 to communicate wirelessly with external devices or entities such as other autonomous machines and/or a central control unit controlling operation of the machine 10. The power source 32 stores energy and energizes the other components of the machine 10 and may include a rechargeable battery. The sensors 34, 36 collect machine state data, environmental data, or both. Machine state data may include, for example, operating status, fill level of the product holding and distribution system 16 or inertial movement of the machine 10. Environmental data may include, for example, ground surface features or ambient weather information.

The controller 20 communicates with the other components of the communications and control system 18 and generally directs operation of the system 18 and the machine 10. The controller 20 preferably includes a digital integrated circuit and may be or include a general use, commercial off-the-shelf computer processor. Alternatively, the controller 20 may be a programmable logic device configured for operation with the system 18 or may be an application specific integrated circuit (ASIC) especially manufactured for use in the system 18. While illustrated as a single component in the block diagram of FIG. 2, the controller 20 may include two or more separate devices working in cooperation to control operation of the system 18. Furthermore, if the controller 20 includes multiple elements, such as multiple integrated circuits, the elements may be placed at various places on the machine 10 and in wired or wireless communication with each other.

The machine 10 may be between one-half meter and one meter in length, between one-fourth and one-half meter in width, and between one-fourth meter and one meter in height. It will be appreciated, however, that principles of the present invention may be used with machines of varying sizes and configurations and that the particular size and configuration of the machine 10 is not critical. In some applications it is desirable to use a relatively small machine. Advantages of using relatively small, autonomous machines for agricultural operations include reduced cost, improved scalability, less environmental impact, greater reliability and increased productivity.

The use of relatively small, autonomous machines presents advantages for some agricultural operations. By way of example, small autonomous machines cost less to build because they do not require an operator cabin or operator environment and therefore require fewer materials to build and are simpler to design and manufacture. Operations involving small autonomous machines may be scaled from one or two machines to hundreds of machines depending on the size and needs of the operation, and their operation may be more environmentally friendly because they may be electric, consume less energy and avoid soil damage such as soil compaction. These machines are typically more reliable because each machine is smaller and simpler in design than traditional agricultural equipment, resulting in fewer machine malfunctions or failures and less time to repair when a malfunction or failure occurs. Furthermore, if a group of autonomous machines is used for an operation, the failure or malfunction of one or two machines would typically have limited impact on the overall operation as the remaining machines could continue operating. The use of autonomous machines may result in increased productivity as autonomous machines are not limited by operator availability and may work continuous all day and all night.

The controller 20 is configured to control the machine 10 to follow a guidance path and to perform an agricultural operation, such as planting seeds, along the guidance path. A guidance path (also referred to herein as a "reference path"), such as the path 38 illustrated in FIG. 3, may be stored on the machine 10 or may be communicated to the machine 10 via the communications component 30. The path 38 is illustrated and described herein on a two-dimensional plane defined by an X axis and a Y axis, as variations in ground surface altitude are negligible and, thus, it may be assumed that the machine 10 is operating on a flat surface and the third dimension (Z axis) may be neglected. Therefore, the machine's position may be defined by a location ($P_X$, $P_Y$) of the machine's center 40 and an orientation of the machine's velocity vector 42.

Figure 3:
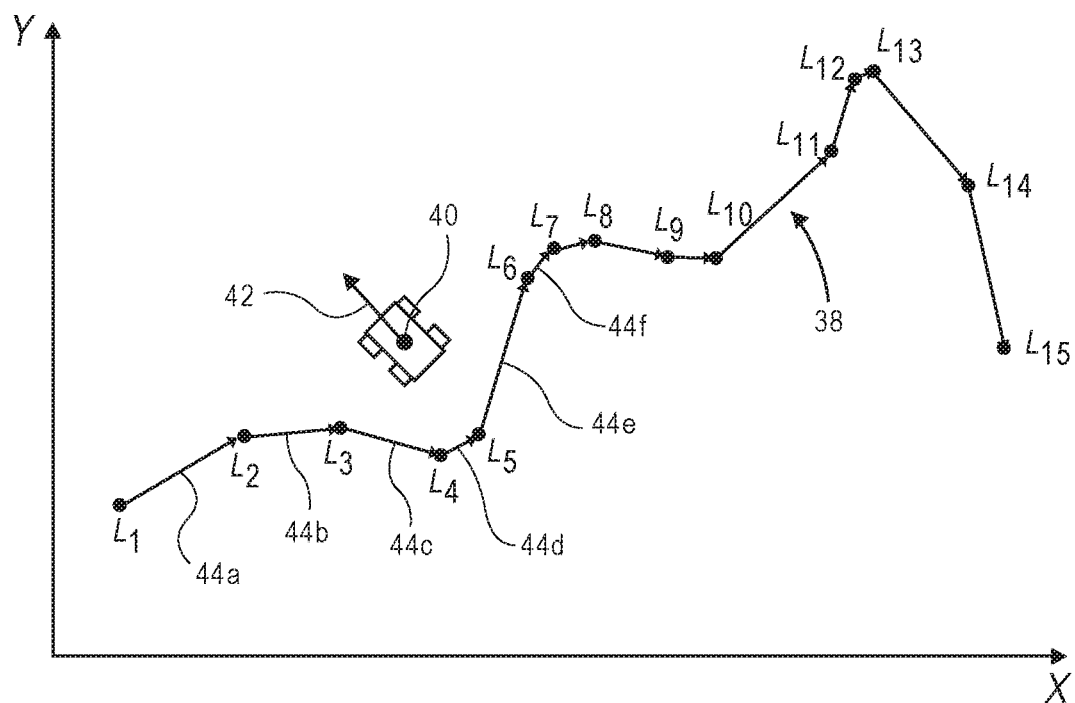
FIG. 3 illustrates an exemplary guidance path used by the mobile machine of FIG. 1 when performing an agricultural operation.

The guidance path 38 illustrated in FIG. 3 is defined by a series of geographic locations L1-L15, also referred to herein as landmarks, connected by direction vectors 44 defining a direction of travel from one landmark to the next landmark. For curved paths a larger number of landmarks L results in a more accurate path definition. As the machine 10 travels along the guidance path 38, it uses each direction vector as a navigational reference until it arrives at the next direction vector, then uses that vector as a navigational reference. To determine which of the direction vectors the machine 10 is to use for its present reference vector and when to switch to the next vector the machine 10 uses a method that is illustrated in FIG. 4 and explained below.

Figure 4:
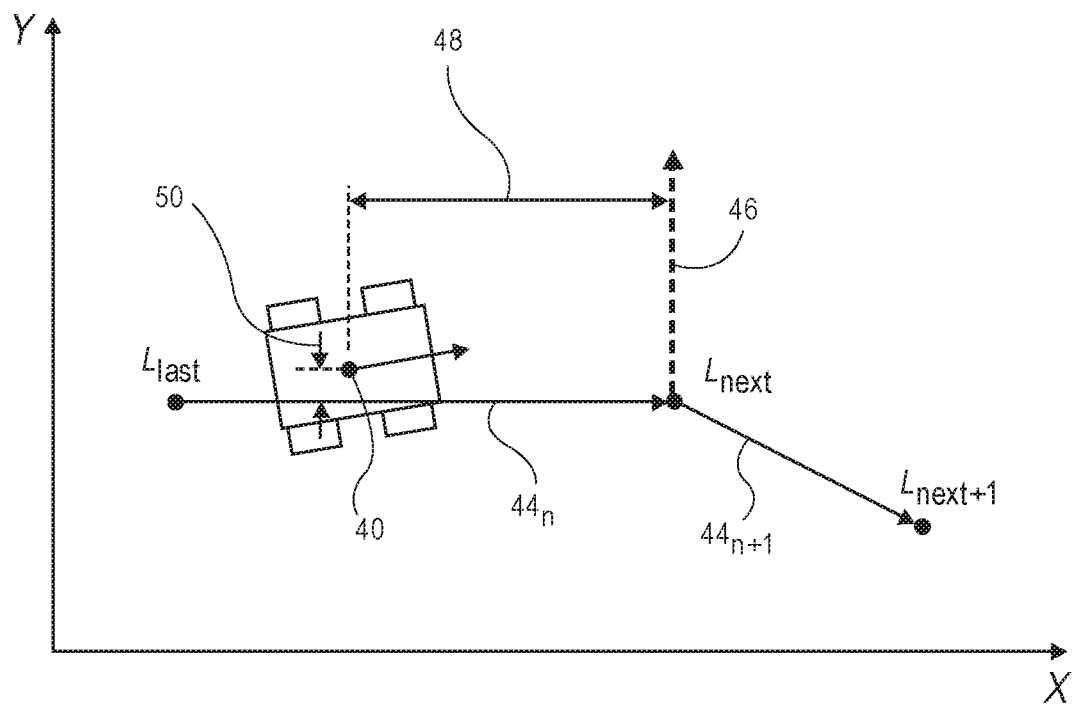
FIGS. 4-7 illustrate portions of the guidance path of FIG. 3 in greater detail and various markings used to illustrate how a guidance system of the mobile machine navigates the machine to follow the guidance path.

FIG. 4 depicts a scenario in which the machine 10 uses as a navigational reference a direction vector 44$n$, also referred to herein as the reference vector, defined by a previous landmark $L_{last}$ and a next landmark $L_{next}$. The distance 48 from the machine 10 to the next landmark $L_{next}$ is determined as the shortest distance between the machine's center 40 and a vector 46 passing through the next landmark $L_{next}$ that is orthogonal to the reference vector 44$n$. The distance 48 from the machine's center 40 to the next landmark will also be referred to herein as $d_{nlm}$. The orthogonal vector 46 may be determined using the reference vector 44$n$ according to equation (1):

$$\vec{dir}_{ortho} = \begin{bmatrix} 0 & -1 \\ 1 & 0 \end{bmatrix} \cdot \vec{dir} \tag{1}$$

where $\vec{dir}_{ortho}$ is the orthogonal vector 46 and $\vec{dir}$ is the reference vector 44$n$. The distance 48 to the next landmark may be determined using the orthogonal vector 46 according to equation (2):

$$d_{nlm} = \frac{|\vec{dir}_{ortho} \times (\vec{r}_p - \vec{r}_{nlm})|}{|\vec{dir}_{ortho}|} \tag{2}$$

Neglecting the Z coordinate, equation (2) simplifies to equation (3):

$$d_{nlm} = \frac{\left\| \begin{matrix} dir_{orthoX} & r_{pX} - r_{nlmX} \\ dir_{orthoY} & r_{pY} - r_{nlmY} \end{matrix} \right\|}{\left\| \begin{pmatrix} dir_{orthoX} \\ dir_{orthoY} \end{pmatrix} \right\|} \tag{3}$$

If the absolute value of the determinant in equation (3) is ignored the value of $d_{nlm}$ is positive or negative depending on the position of the machine 10 with respect to the orthogonal vector 46. Thus, when the sign of $d_{nlm}$ changes the machine has crossed the orthogonal vector 46 and the reference vector becomes the next direction vector 44$n$+1.

The distance 50 from the machine's center 40 to the reference vector 44$n$ may be determined using a method similar to the method set forth above for finding the distance 48 to the orthogonal vector 46. Replacing the orthogonal vector ($\vec{dir}_{ortho}$) with the reference vector ($\vec{dir}$) and replacing $\vec{r}_{nlm}$ with $\vec{r}_{llm}$ in equation (2) results in equation (4):

$$d = \frac{\left\| \begin{matrix} dir_X & r_{pX} - r_{llmX} \\ dir_Y & r_{pY} - r_{llmY} \end{matrix} \right\|}{\left\| \begin{pmatrix} dir_X \\ dir_Y \end{pmatrix} \right\|} \tag{4}$$

where d is the distance 50 between the machine center 40 and the reference vector 44$n$.

Figure 5:
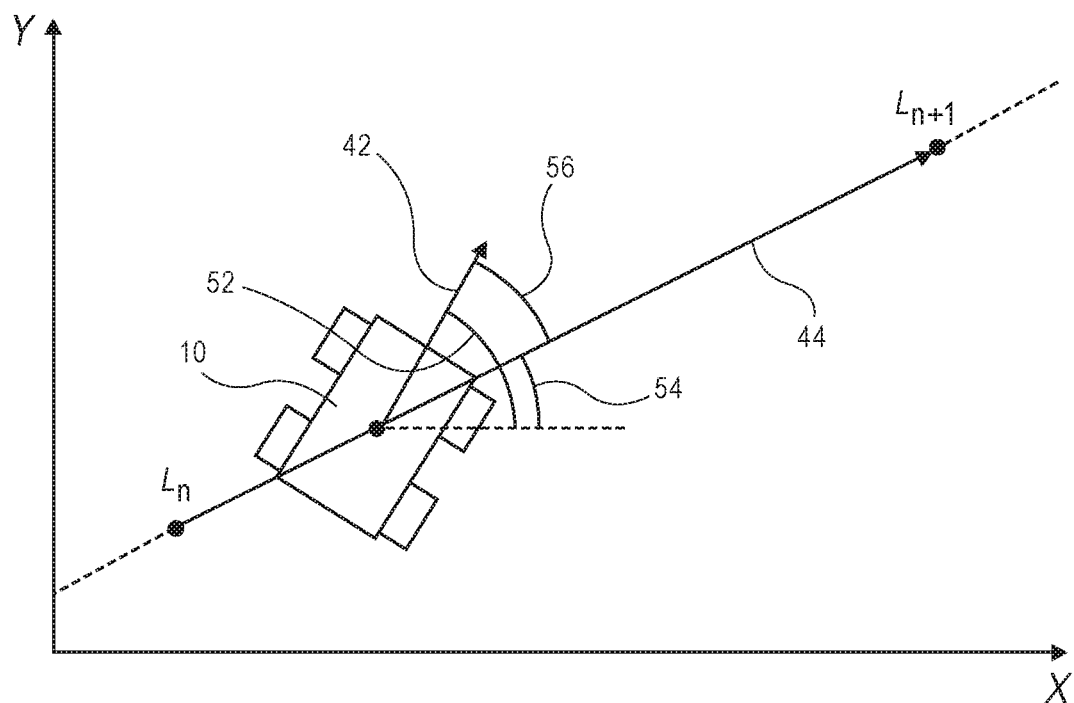

With reference now to FIG. 5, the machine's reference heading error is illustrated. While the machine 10 in FIG. 5 is positioned on the reference vector 44 (that is, d=0), the machine's velocity vector 42 is not aligned with the reference vector 44. The machine's reference heading error is the difference between the machine's heading, represented by the heading vector 42, and the reference vector 44. If an angle of the machine's heading vector 42 is defined by an angle 52 between the vector 42 and the X axis, and an angle of the reference vector 44 is defined by an angle 54 between the vector 44 and the X axis, the reference heading error may be defined as the angle 56 corresponding to the difference between the angle 52 and the angle 54. Thus, in the scenario of FIG. 5 there is a need to adjust the machine's heading to align with the reference vector 44. If the machine 10 were perfect in adjusting for reference heading errors, simply controlling the machine's heading relative to the reference vector 44 would be sufficient to keep the machine 10 on the reference vector. In practice, however, even an efficient controller would not be able to perfectly adjust the machine's heading and the machine 10 would deviate from the reference vector 44 such that d≠0.

Figure 6:
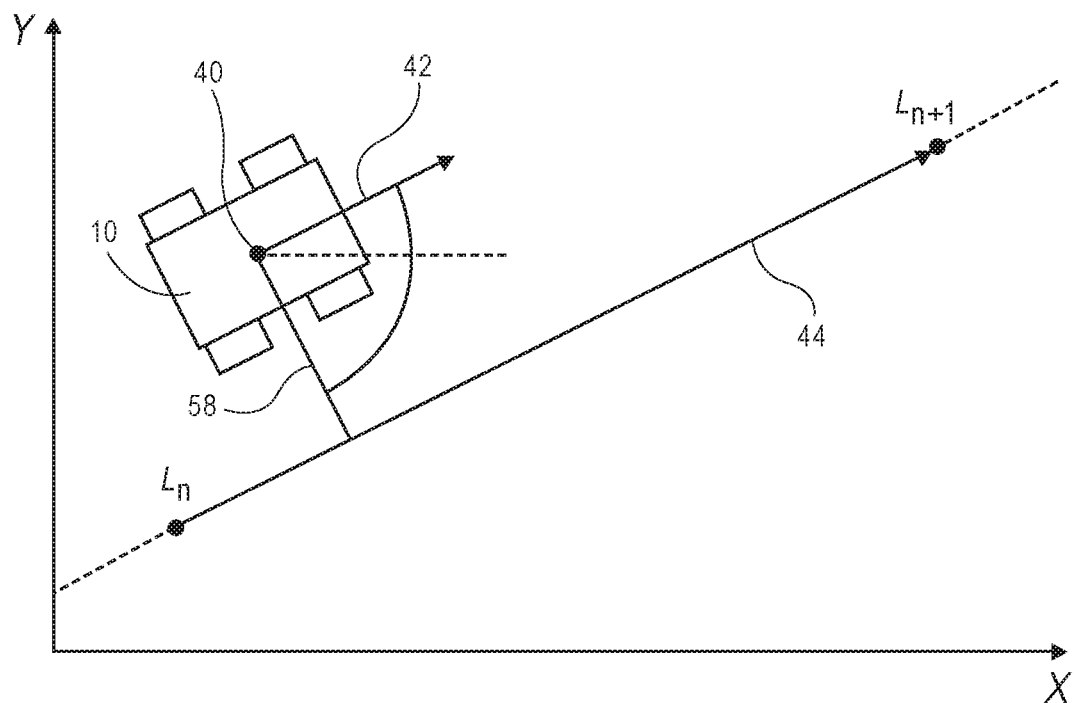

In the scenario depicted in FIG. 6 the machine 10 is not located on the reference vector 44 but the machine's heading, represented by the machine's velocity vector 42, is parallel with the reference vector 44. In other words, the machine 10 has a distance error (d>0) but does not have a reference heading error. If the controller 20 were configured to adjust only the machine's heading relative to the reference heading 44—and not to correct the machine's distance d from the reference vector 44—the machine 10 would continue to travel along a path parallel to the reference vector 44 (rather than move toward the reference vector 44) in the scenario depicted in FIG. 6 because the machine's reference heading error is zero. Thus, the controller 20 must be configured to reduce the distance d to zero if the machine is going to return to the reference vector 44.

A controller configured to correct the distance error d separately from the reference heading error may attempt to follow the shortest line to the reference vector by turning the machine ninety degrees clockwise, driving along the line 58, and then when the machine 10 is on the reference vector 44 turn ninety degrees counterclockwise so that the machine's heading is once again aligned with the reference vector 44. Given that in practice the machine 10 will almost always be off the reference vector 44 by at least a small distance, this approach would not be effective. Embodiments of the present invention involve controlling a machine to follow a reference path by considering both reference heading errors and distance errors.

As the machine 10 follows the guidance path 38, its positioning error can be described by two heading errors—a distance heading error and a reference heading error. The distance heading error is the difference between the machine's actual heading, represented by the velocity vector 42, and the optimal heading to return the machine to the reference vector 44. The optimal heading to return the machine to the reference vector 44 will also be referred to herein as the optimal distance heading. The distance heading error is ninety degrees in the scenario illustrated in FIG. 6 because the optimal heading to return the machine 10 to the reference vector 44 would be aligned with the line 58. The reference heading error is the difference between the machine's actual heading represented by the velocity vector 42 and the heading defined by the reference vector 44, as explained above. A control method addressing either one of these heading errors—without addressing the other—would be insufficient to navigate the machine 10 along the path 38 for the reasons set forth above. Embodiments of the present invention employ a control method that uses both heading errors to generate control signals for driving the machine to follow the guidance path 38.

For convenience, reference is made herein to two controllers—a distance heading controller and a reference heading controller. This dichotomy has reference to two control functions, a first that attempts to guide the machine to be aligned with the optimal distance heading and a second that attempts to guide the machine to be aligned with the reference heading. It will be appreciated, however, that the discussion of the present invention in terms of two controllers does not require two distinct controllers to be implemented. In other words it does not require two distinct systems, two distinct devices or even two distinct pieces of software. Principles of operation of the two controllers may be combined into a single controller presenting the functionality of two, combined controllers.

Figure 7:
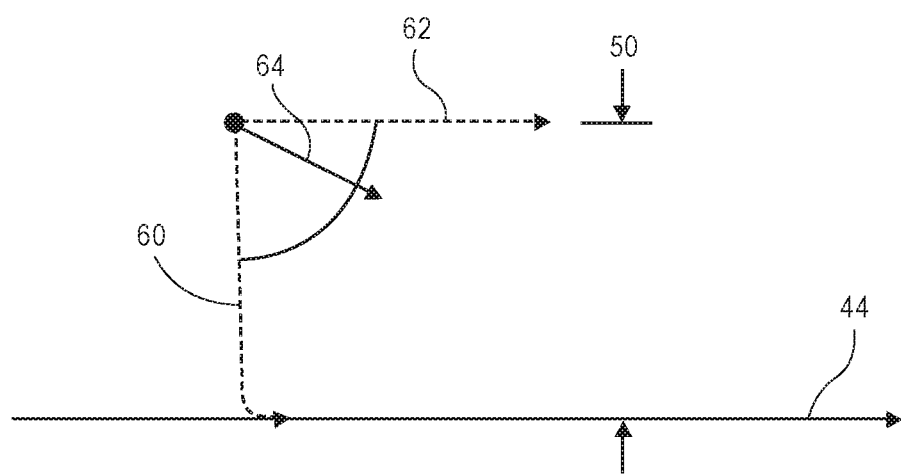

FIG. 7 illustrates exemplary interaction between the distance heading controller and the reference heading controller. The distance heading controller seeks to follow path 60 to reduce the distance d to zero and quickly return the machine 10 to the reference vector 44, while the reference heading controller seeks to follow path 62 that is parallel with the reference vector 44 notwithstanding the distance error d. Neither of these controller outputs is, by itself, a practical solution as explained above. Embodiments of the present invention use a combination of the distance heading controller and the reference heading controller to determine a target heading 64 that is then used to navigate the machine 10 toward and along the reference vector 44 that is part of the guidance path 38. As illustrated in FIG. 7, the target heading 64 is a combination of a heading generated by the reference heading controller and a heading generated by the distance heading controller. More particularly, the controller combines the two headings using a weighting algorithm that assigns a weight to each of the headings 60 and 62 according to the distance 50 of the machine 10 from the reference vector 44.

The controller arbitrates the reference heading and the distance heading using a hyperbolic tangent function according to the following equations:

$$\text{ratio}_{dc} = \tan h(\text{err}_{slope} \times |d|) \quad (5)$$

$$\text{ratio}_{hc} = 1 - \text{ratio}_{dc} \quad (6)$$

where $\text{ratio}_{dc}$ denotes the weight of the distance controller and $\text{ratio}_{hc}$ denotes the weight of the heading controller. The additional gain $\text{err}_{slope}$ in the argument is a tunable parameter that influences the slope of the hyperbolic tangent curve. Both $\text{ratio}_{dc}$ and $\text{ratio}_{hc}$ add up to one so that the total control output is never amplified.

Figure 8:
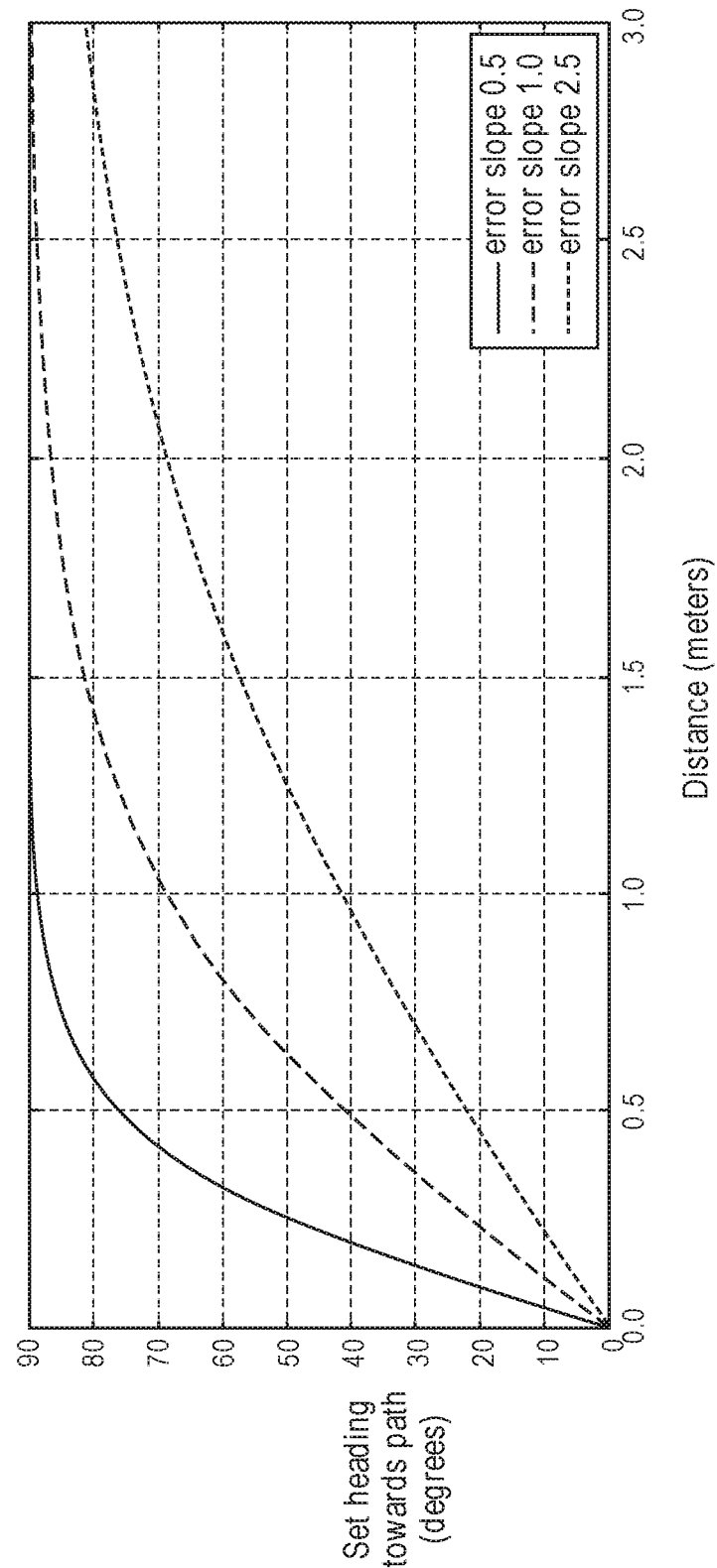
FIG. 8 is a graph illustrating how the orientation of the mobile machine changes according to a distance from the guidance path and for different values of an error slope parameter used with a control algorithm in accordance with embodiments of the present invention.
Figure 9:
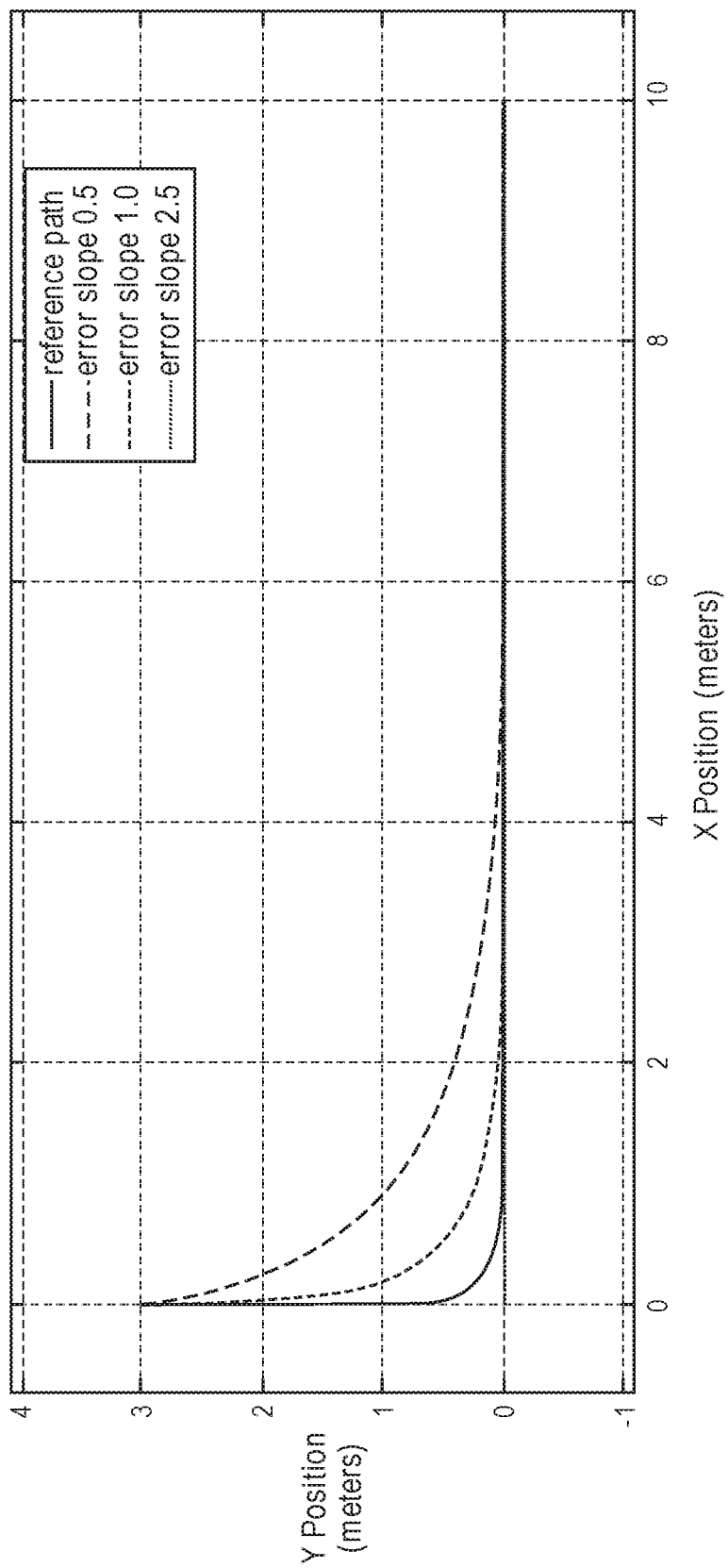
FIG. 9 is a graph illustrating paths followed by the mobile machine for different values of the error slope parameter used with the control algorithm.

FIG. 8 illustrates desired machine headings relative to the reference vector 44 dependent on the distance d between the machine and the reference vector 44 and for different values of $\text{err}_{slope}$. The graphs of FIG. 8 illustrate that as the distance d between the machine 10 and the reference vector 44 increases, the target heading angle increases toward ninety degrees. In other words, as the distance d between the machine 10 and the reference vector 44 increases the target heading increasingly points towards the reference vector 44. FIG. 9 depicts approach shapes for different values of $\text{err}_{slope}$. When the machine 10 is more than one or two meters from the reference vector 44 (depending on the value of $\text{err}_{slope}$) it first drives straight toward the reference vector 44 to reduce the distance error d, then follows a path that gradually turns to follow the reference vector 44.

Figure 10:
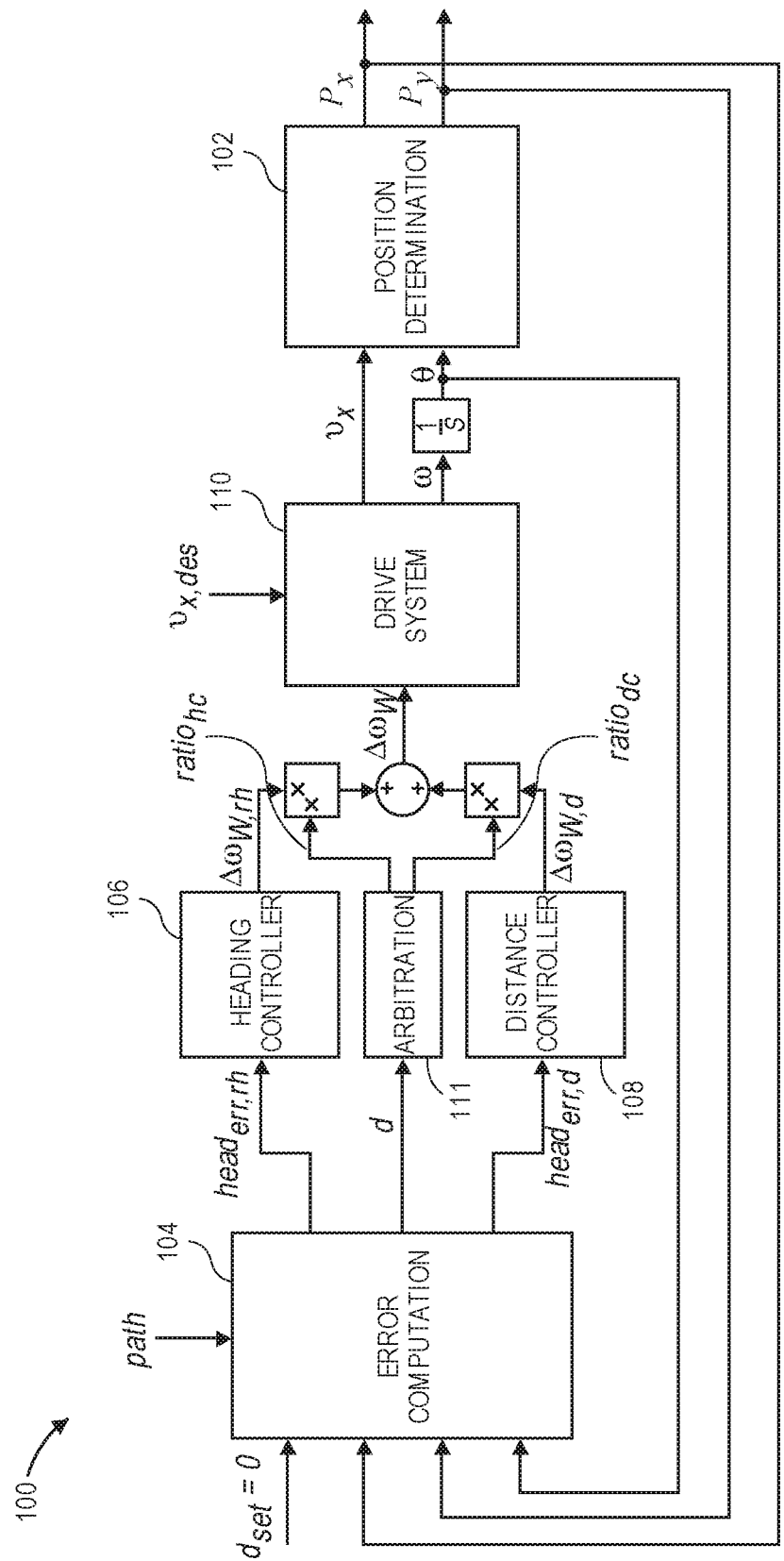
FIG. 10 is a diagram illustrating an exemplary first control structure for implanting a control algorithm for the mobile machine.

An exemplary competitive-cooperative control structure 100 is illustrated in FIG. 10 and may be implemented using the controller 20 described above. The control structure 100 includes various functions or sections referred to herein as modules with the understanding that each of the various modules may be implemented in hardware, software or a combination thereof. Furthermore, two or more of the modules may be combined into a single piece of hardware or software.

During operation the machine's velocity $v_x$ and yaw rate ω are detected, and the machine's orientation θ is determined by integrating the yaw rate ω over time. A position determination module 102 uses the machine's velocity $v_x$ and orientation θ to determine the machine's geographic position using equations (7) and (8):

$$P_x(t)=P_x(t=0)+\int v_x \cos \theta \, dt \quad (7)$$

$$P_y(t)=P_y(t=0)+\int v_x \sin \theta \, dt \quad (8)$$

An error computation module 104 receives data defining the guidance path 38, the machine's orientation θ and the machine's position ($P_x$, $P_y$) and determines the distance error d using equation (4) described above. The error computation module 104 also determines the reference heading error (head$_{err,rh}$) and the distance heading error (head$_{err,d}$) by comparing the machine's orientation θ with the reference heading and the distance heading. A heading controller module 106 receives the reference heading error and a distance controller module 108 receives the distance heading error. The heading controller module 106 implements a first proportional-integral-derivative (PID) control function to generate a first set of control values ($\Delta\omega_{W,rh}$) for operating the driven wheels of the machine 10 to adjust the machine's heading to align with the reference heading. The first set of control values represents a change in the rotational speed of the driven wheel or wheels on the left side and on the right side of the machine 10 necessary to steer the machine 10 to align with the reference heading. Similarly, the distance controller module 108 implements a second proportional-integral-derivative (PID) control function to generate a second set of control values ($\Delta\omega_{W,d}$) for operating the wheels of the machine 10 to align the machine's heading with the distance heading. The second set of control values represents a change in the rotational speed of the driven wheel or wheels on the left side and on the right side of the machine 10 necessary to drive the machine to align the machine with the distance heading.

An arbitration module 111 receives the distance error d from the error computation module 104 and generates the weight values ratio$_{dc}$ and ratio$_{hc}$ according to equations (5) and (6) as described above. The weight values are used as multipliers to adjust the first and second sets of control values to generate a first set of weighted control values and a second set of weighted control values. The first and second sets of weighted control values are added to generate a combined set of control values, and the combined set of control values is communicated to a drive system 110 and used to drive the wheels 14 of the machine 10 according to the desired machine velocity $v_{x,des}$.

Figure 11:
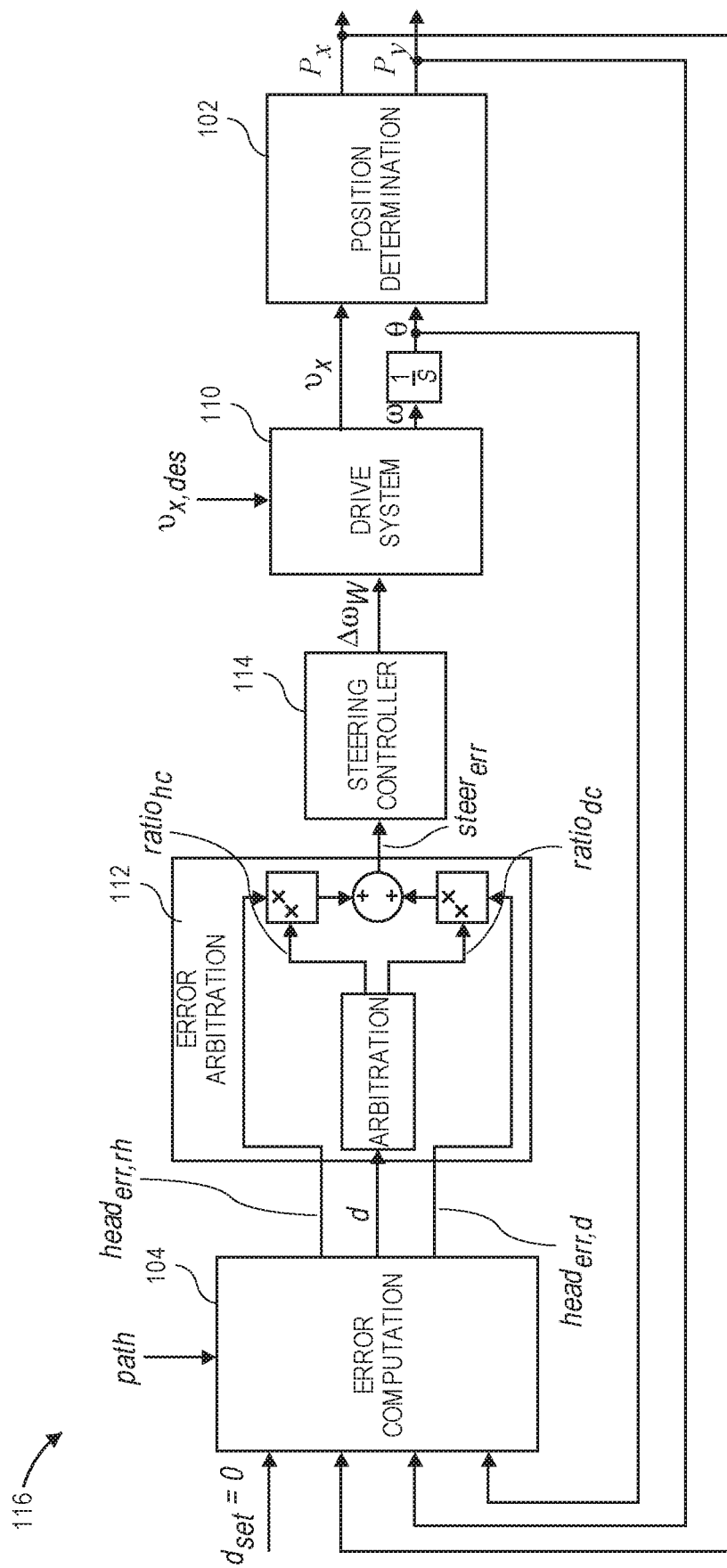
FIG. 11 is a diagram illustrating an exemplary second control structure for implanting a control algorithm for the mobile machine.

In the control structure illustrated in FIG. 10 a separate PID controller is employed by each of the heading controller module 106 and the distance controller module 108. This has some advantages in that each of the PID controllers may be separately adjusted, however it does render the analytical description of the system using classic signal theory more complex. An alternative implementation is illustrated in FIG. 11 that reduces the complexity by applying a single PID controller after the arbitration function rather than applying two separate PID controllers before the arbitration function. If both of the PID controllers have identical parameters, the value $\Delta\omega_W$ of FIG. 10 can be defined by the following equation:

$$\Delta\omega_W = \left(k_p + \frac{k_i}{s} + k_d s\right) \times head_{err,rh} \times ratio_{hc} + \quad (9)$$
$$\left(k_p + \frac{k_i}{s} + k_d s\right) \times head_{err,d} \times (1 - ratio_{hc})$$

which can be rewritten as $$\Delta\omega_W = \quad (10)$$
$$\left(k_p + \frac{k_i}{s} + k_d s\right) \times (head_{err,rh} \times ratio_{hc} + head_{err,d} \times (1 - ratio_{hc}))$$

Equation (10) illustrates that the heading errors may first be weighted using the error arbitration module 112, and then a single PID controller applied after the heading errors are weighted. For simplicity the PID controller is labeled steering controller 114 in FIG. 11.

The control structure 116 illustrated in FIG. 11 is simpler and easier to work with than the control structure 100 illustrated in FIG. 10. The control structure 116 may be further reduced. The heading controller 106 and the distance controller 108 act on headings that are always perpendicular to each other, therefore the target heading of the machine 10 may be determined as a function of the distance error and the reference heading as illustrated in equation (11):

$$\Delta\omega_W = \left(k_p + \frac{k_i}{s} + k_d s\right) \times \left(\left(head_{ref} - \frac{\pi}{2}\tanh(-err_{slope} \times d)\right) - \theta\right) \quad (11)$$

Figure 12:
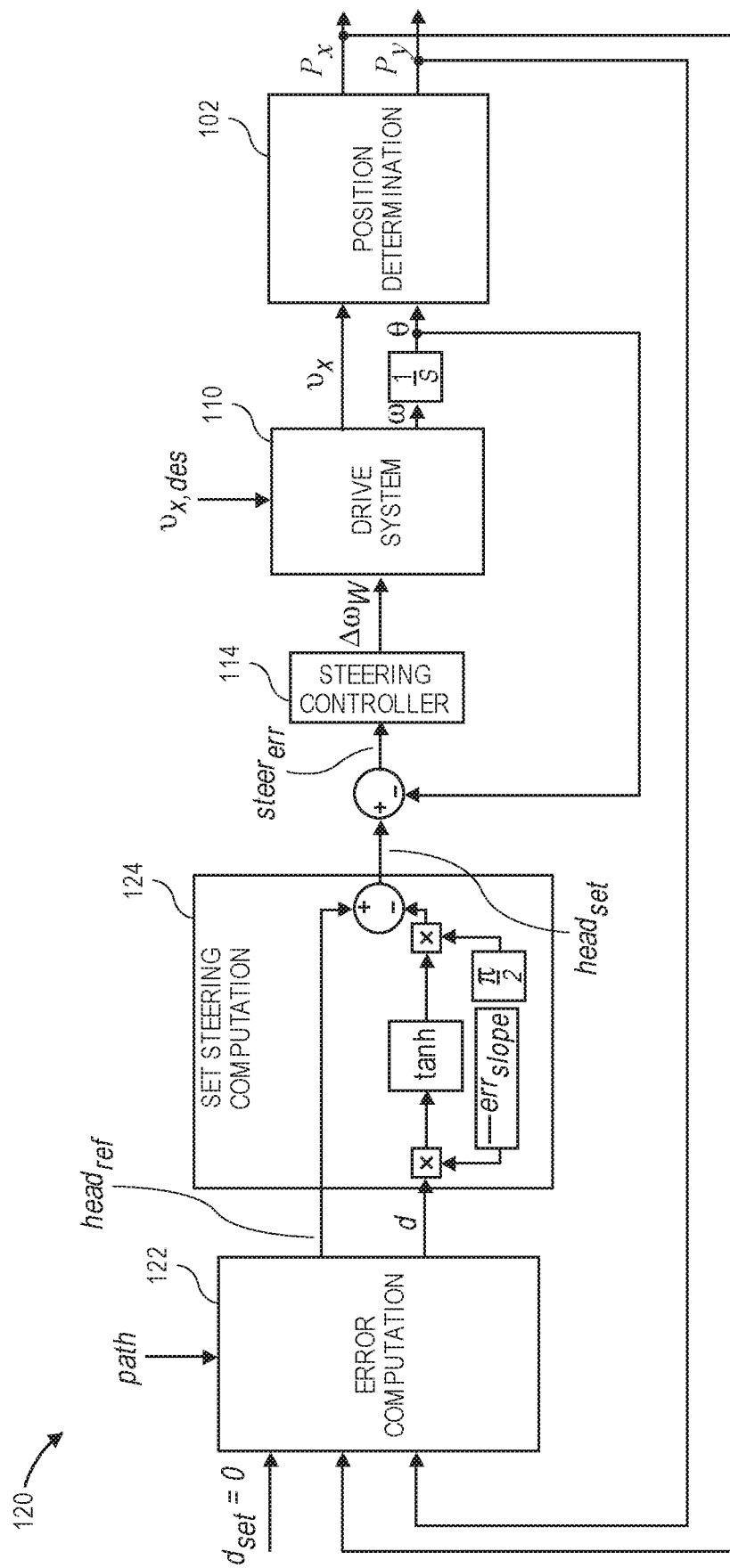
FIG. 12 is a diagram illustrating an exemplary third control structure for implanting a control algorithm for the mobile machine.

Applying equation (11), the control structure depicted in FIG. 11 can be reduced to the control structure 120 depicted in FIG. 12. The control structure 120 uses the reference heading and the distance d, determines a heading adjustment value dependent on the distance d, determines a steering error by subtracting the heading adjustment value and the orientation θ of the machine from the reference heading, uses the steering error to generate steering control signals, and communicates the steering control signals to the drive system 110.

More particularly, using the control structure 120, the error computation module 122 calculates the distance error d and, if necessary, the reference heading head$_{ref}$. It communicates the distance error d and the reference heading head$_{ref}$ to a set steering computation module 124. The set steering computation module 124 multiplies the distance error d by the parameter err$_{slope}$ and determines the hyperbolic tangent of the product of the values d and err$_{slope}$. The set steering computation module 124 then multiplies the result of the hyperbolic tangent function by π/2, and subtracts that result from the reference heading to generate a set heading (head$_{set}$) value. The machine's orientation θ is subtracted from the head$_{set}$ value to generate a steering error steer$_{err}$, which is communicated to the steering controller module 114 to generate the $\Delta\omega_W$ value that is communicated to the drive system 110.

It should be noted that the control structure 120 includes two feedback loops. The inner loop controls the robot's heading while the outer loop reduces the distance error. Stated differently, the outer loop determines what the machine's heading should be (referred to herein as the "set heading" or head$_{set}$) while the inner loop controls the robot to follow the set heading. The outer loop is not a classic linear controller as its behavior follows a defined nonlinear function. The error slope (err$_{slope}$) is associated with the outer loop and influences the shape of the approach path followed by the outer control loop, as illustrated in FIGS. 8 and 9. FIG. 8 illustrates how the set heading changes according to the distance of the machine from the guidance path with different error slope values. Larger error slope values result in greater accuracy in that they enable the machine to reach the guidance path more quickly, but they also result in turns with smaller turning radii (that is, sharper turns) closer to the guidance path. This is also illustrated in FIG. 9, which charts machine paths corresponding to the different error slope values of FIG. 8. Smaller turning radii can result in less stability, as explained below.

It should be noted that it is not necessary for the machine to have a forward velocity to correct heading errors because the machine, being a skid-steer machine, can turn (that is, change its heading) when forward velocity is zero. Thus, the machine's forward velocity may be reduced to avoid or mitigate the accumulation of distance errors without impeding the machine's ability to correct for heading errors. The forward velocity can even be reduced to zero to execute a turn with a turn radius of zero (in other words, a turn corresponding to a sharp corner).

The controller may use one or more internal values as indicators to determine when the machine's speed should be adjusted. By way of example, the value of the steering error $steer_{err}$ (see, e.g., FIGS. 11 and 12) exceeding a particular threshold may indicate that the controller is unable to adjust the machine's heading error quickly enough to keep up with the changing set heading. In that situation the distance error (the distance of the machine's location from the reference path) may continue to increase if the machine's heading cannot be corrected quickly enough. Therefore, in that situation it is desirable to temporarily reduce the machine's forward velocity to allow the controller to correct the machine's heading error before the distance error grows larger. As the machine 10 slows down the controller continues correcting the machine's heading error. As the heading error approaches the reference heading the controller may increase the machine's forward velocity to the desired velocity. If a large heading error is detected the controller may reduce the forward velocity of the machine to zero while the heading error is corrected. This situation may occur, for example, when the machine 10 reaches a sharp bend (corner) in the reference path.

Figure 13:
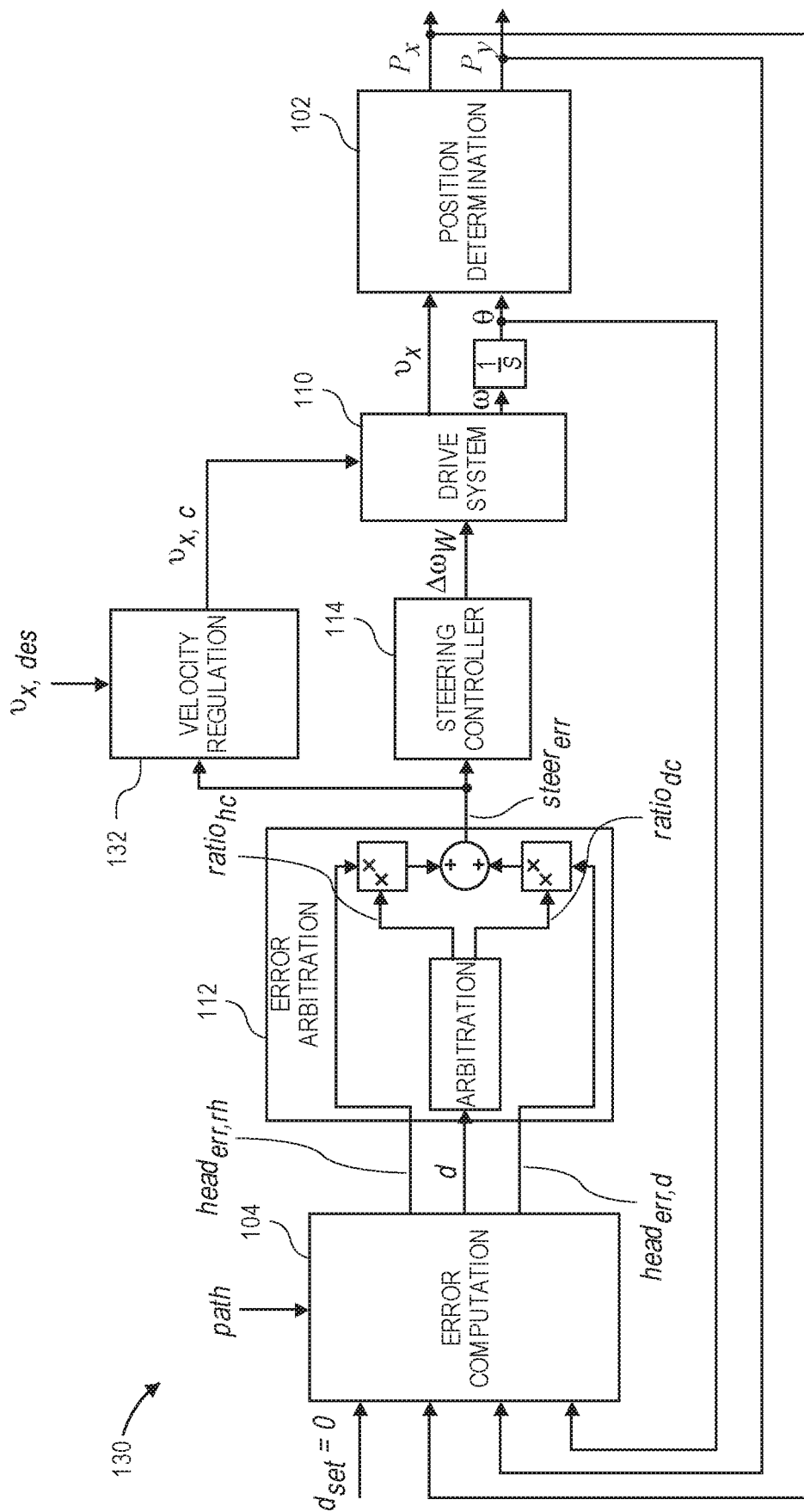
FIG. 13 is a diagram illustrating an exemplary fourth control structure for implanting a control algorithm for the mobile machine.
Figure 14:
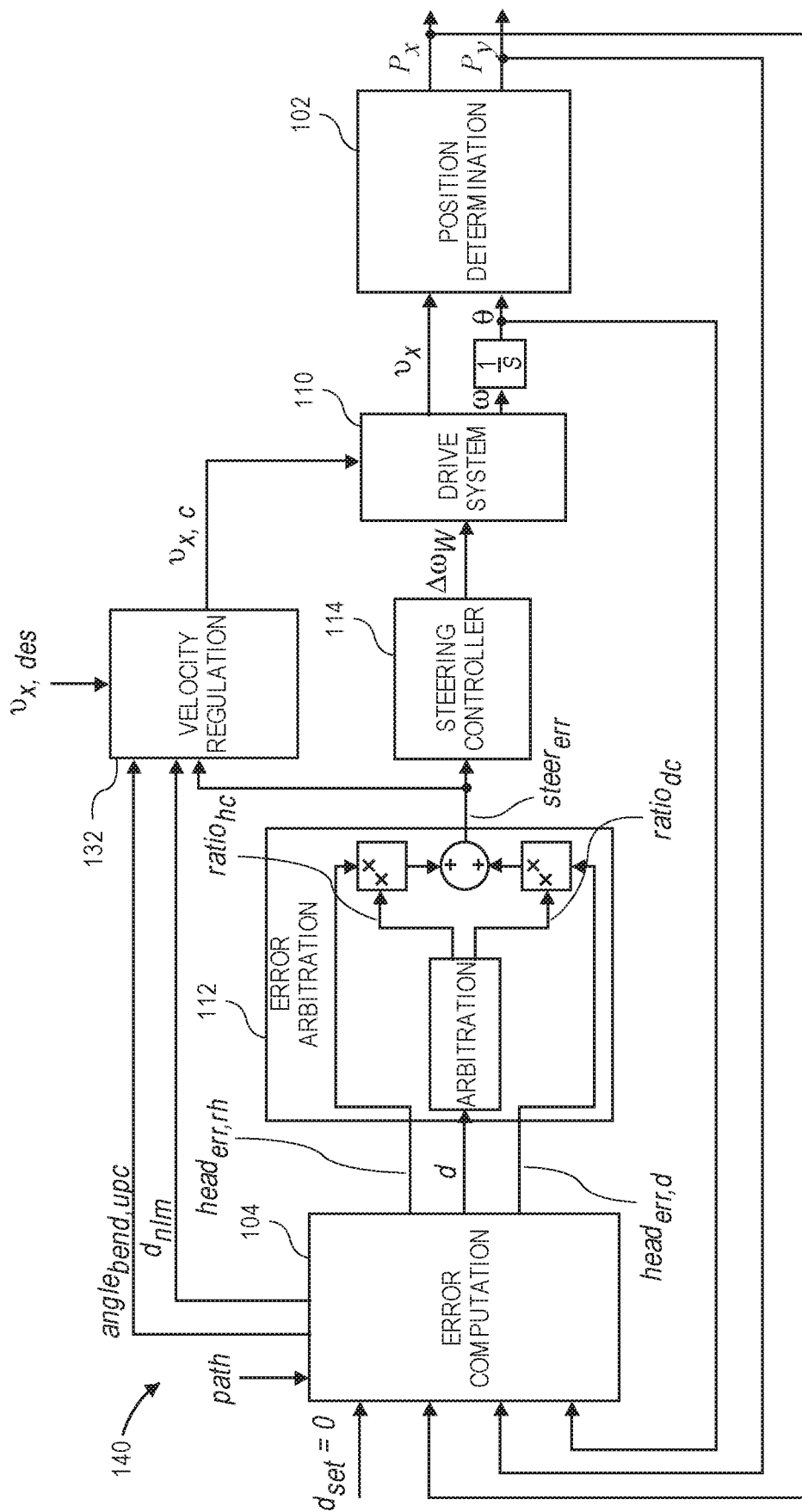
FIG. 14 is a diagram illustrating an exemplary fifth control structure for implanting a control algorithm for the mobile machine.

A control structure 130 according to an embodiment of the invention is illustrated in FIG. 13 and includes a velocity regulation module 132. In the control structures 100, 116 and 120 the drive system receives the desired machine velocity $v_{x,des}$ and uses $v_{x,des}$ as the target velocity without regulating or adjusting the target velocity. The velocity regulation module 132 of the control structure 130 receives the target velocity $v_{x,des}$ and regulates it using the steering error ($steer_{err}$) value according to the following equation:

$$v_{x,c} = v_{x,des} \times (0.5 \times (1.0 - \tan h(vel_{slope} \times (|steer_{err}| - vel_{switch,err})))) \quad (12)$$

Where $v_{x,c}$ is the current velocity communicated to the drive system 110, $vel_{switch,err}$ is an error threshold and $vel_{slope}$ is a design parameter. It may not be desirable to regulate the velocity at all when the steering error is relatively small. Hence, the error threshold value $vel_{switch,err}$ is used to determine when the velocity regulation is engaged. By way of example, the value of $vel_{switch,err}$ may be between five degrees and forty degrees. In some embodiments of the invention the value of $vel_{switch,err}$ may be about fifteen degrees. The hyperbolic tangent function (tan h) provides for smooth changes in the machine's velocity and avoids abrupt changes that may occur when the steering error crosses the threshold value without the use of the hyperbolic tangent function. It was found in testing a particular prototype that a value for $vel_{slope}$ of 6.85 was effective, but different values of $vel_{slope}$ will be optimal for different machines and in different applications.

Because the controller has guidance path information defining the guidance path, it can anticipate a need to adjust the machine's forward velocity. This is beneficial because in practice machines are typically unable to stop immediately such as, for example, where there is a sharp bend or corner in the guidance path. In that situation by the time the controller reacts to the change in heading error and stops the machine 10, the machine 10 would have passed the bend and left the guidance path. Anticipating the bend in the guidance path and reducing the machine's velocity in advance of reaching the bend helps to avoid the problem of overshooting the bend. This approach also takes advantage of the machine's ability to execute a zero radius turn. On very sharp bends or corners, for example, the machine's velocity may be reduced to zero while the machine's heading is adjusted.

Equation 13 is an algorithm that may be used by the machine to implement the feed forward velocity adjustment:

$$ff_{speed} = v_{x,des} \times \qquad (13)$$
$$\left(1 - (0.5 \times (1 - (\tanh(-ff_{slope,ang} \times (|angle_{bend,upc}| - ff_{th,ang})))) \times \right.$$
$$\left. \left(\left(1 - \left(\tanh\left(|d_{nlm}| \times \frac{slope_{dist,rem}}{v_{x,des}}\right)\right)\right)\left(1 - \frac{0.1}{v_{x,des}}\right)\right)\right)$$

where $ff_{speed}$ is the current velocity value of the machine, $ff_{slope,ang}$ is a user-specified design parameter affecting the slope of the hyperbolic tangent curve as discussed above, $angle_{bend,upc}$ is the angle of the next bend, $ff_{th,ang}$ is a user-specified angel threshold, $d_{nlm}$ is the distance to the next bend and $slope_{dist,rem}$ is a user-defined parameter affecting the slope of the second hyperbolic tangent function.

In this equation there are two hyperbolic tangent functions. The first hyperbolic tangent function ensures that the feed forward velocity management is used only if the angle of the upcoming turn in the guidance path exceeds the threshold $ff_{th,ang}$. In other words, if the angle of the upcoming turn in the guidance path is small (less than the threshold $ff_{th,ang}$) there is less need to use the feed forward velocity management and the velocity regulation module 132 primarily uses the steering error ($steer_{err}$) to regulate the velocity. The first hyperbolic tangent function softens the engagement of the feedforward steering regulation.

Figure 15:
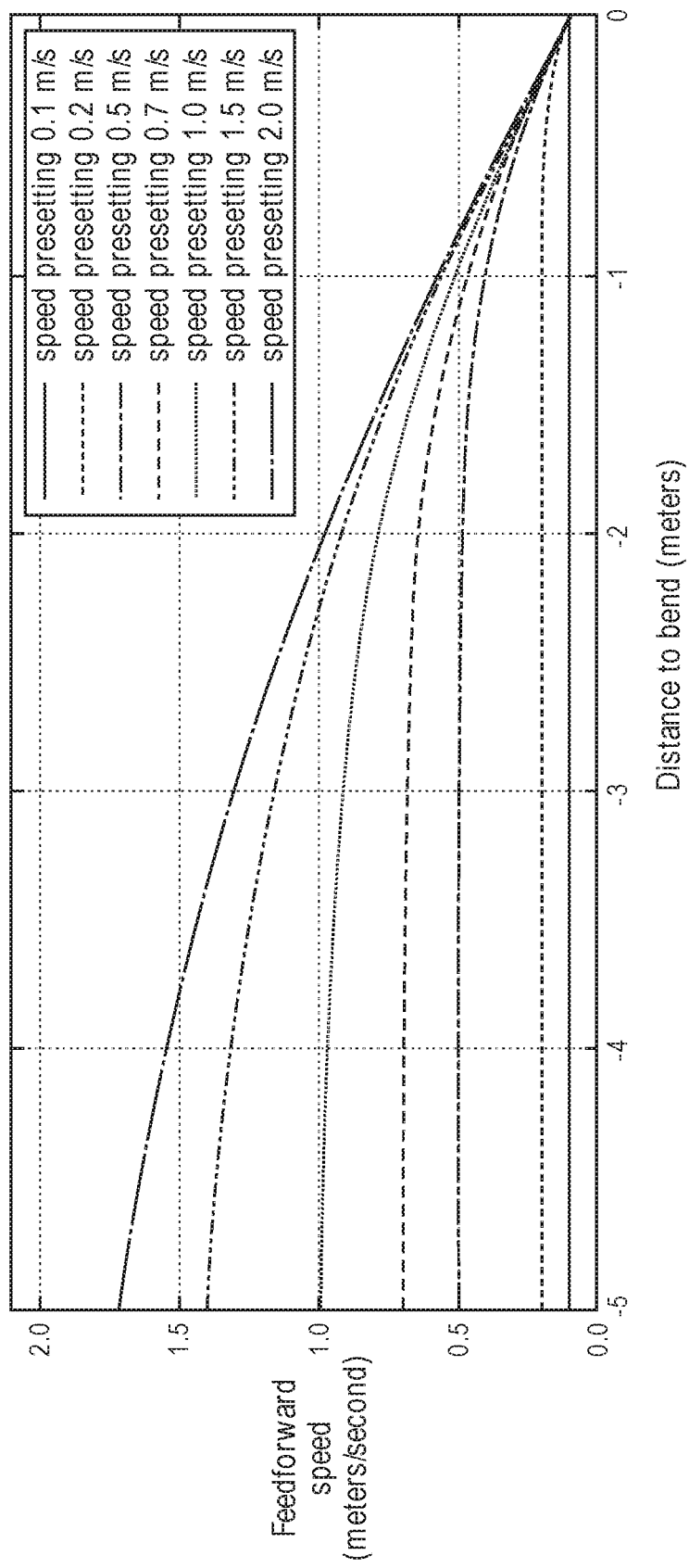
FIG. 15 is a graph illustrating feedforward speeds of the mobile machine at different distances from the guidance path and for different preset speeds, using a feedforward speed control function that takes into account the preset velocity.
Figure 16:
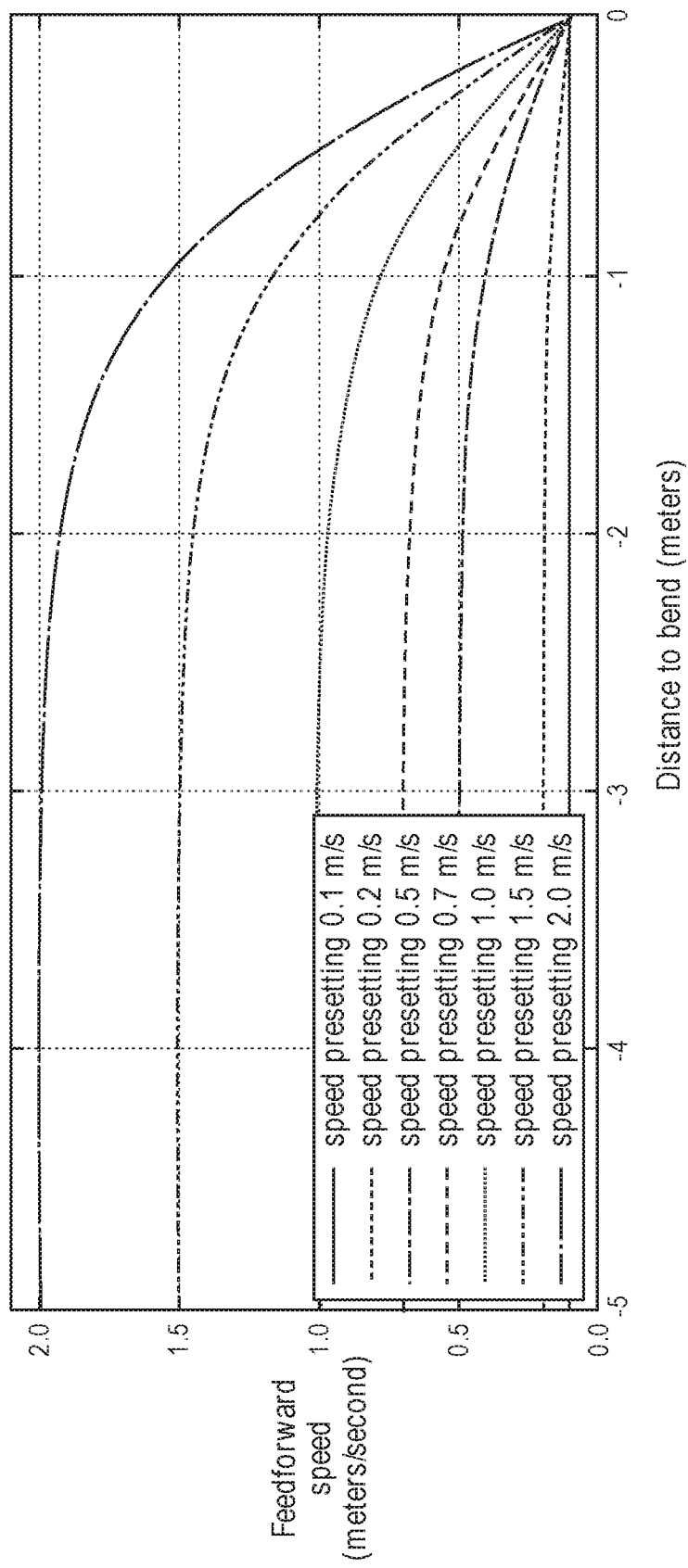
FIG. 16 is a graph illustrating feedforward speeds of the mobile machine at different distances from the guidance path and for different preset speeds, using a feedforward speed control function that does not take into account the preset velocity.

The second hyperbolic tangent function in equation (13) regulates the machine's forward velocity as a function of the distance remaining to the turn in the guidance path. Because the specified velocity $v_{x,des}$ is in the denominator of the $slope_{dist,rem}/v_{x,des}$ term, the slope of the hyperbolic tangent function changes according to the designated velocity. More particularly, the higher the designated velocity, the smaller the slope. FIG. 15 illustrates velocity curves resulting from equation (13) at various designated velocities. By comparison, FIG. 16 illustrates the velocity curves in the same situations as in FIG. 15 except that the controller does not use a slope term with the designated velocity in the denominator. As can be seen from FIG. 16, if the slope is not adjusted for the designated velocity, the velocity decreases rapidly within the last one to two meters, perhaps requiring active braking which wastes energy.

In order for the machine to have the same velocity within a close proximity to the turn the slope of the hyperbolic tangent curve is changed for different initial velocities of the machine. The slope of the hyperbolic tangent curve, then, is a design parameter. Exemplary skeleton computer code for implementing velocity regulation as described herein is set forth in Table 1, below.

TABLE 1

```
// steer error velocity regulation
static float vel_slope = 6.85;
static float vel_switch_err = 0.27;
// feedforward velocity reduction
static float Vx_max = 0.5;
static float ff_bendang_th = M_PI/6;
static float ff_bendang_slope = 9;
static float slope_remaing_dist = 0.5;
void regulateVelocity(struct thread_data* th_data)
{
    // calculate next bend angle
    float next_bend_ang_temp;
    next_bend_ang_temp = th_data->next_refHead - th_data->refHead;
    if (fabs(next_bend_ang_temp) > M_PI) {
        if (th_data->next_refHead < 0) {
            next_bend_ang_temp = th_data->next_refHead - th_data->refHead + 2*M_PI;
        }
        if (th_data->refHead < 0) {
            next_bend_ang_temp = th_data->next_refHead - th_data->refHead - 2*M_PI;
        }
    }
    next_bend_ang = next_bend_ang_temp;
    // speed regulation feedforward approach (0.1 m/s is minimum feedforward speed)
    if(Vx_max > 0.1) {
        ff_speed = Vx_max *
        (1-(0.5*(1-(tanh(-ff_bendang_slope*(fabs(next_bend_ang)-ff_bendang_th)))) *
        ((1-(tanh(fabs(th_data->d_nlm)*slope_remaing_dist/Vx_max)))*(1-
        0.1/Vx_max))));
    } else {
        ff_speed = Vx_max;
    }
    // calculate speed as combination of feedforward and steer error
    th_data->speed_control = ff_speed *
    (0.5*(1.0-tanh(vel_slope*(fabs(steeringError)-vel_switch_err))));
}
```

The control structure 120 can become unstable in situations where the error slope ($err_{slope}$), the machine's velocity, or both are relatively high. This can happen where the set heading defined by the outer loop of the cascading control structure changes at a rate faster than the machine's maximum yaw rate. In other words, the outer loop in the control structure 120 defines a path that the inner loop cannot keep up with. When that happens, the machine overshoots a bend in the defined path. When the controller attempts to correct the overshoot it may define another path with a heading change that exceeds the machine's maximum yaw rate, causing the machine to again overshoot the defined path. This may lead to the machine oscillating around the guidance path, even if the guidance path is a straight line.

As illustrated in FIGS. 8 and 9, larger values of the error slope result in larger machine heading changes closer to the guidance path. Additionally, the greater the machine's velocity the more quickly it must change its heading to keep up with changes in the set heading during the turn. For these reasons the machine 10 is most susceptible to this instability at higher values of the error slope and higher machine velocities. Adjusting the machine's velocity can mitigate this problem, as explained above, but solving the problem by reducing the machine's velocity may not always be desirable. Therefore, the present invention includes a solution to this problem that involves dynamically adjusting the value of the error slope independently of the velocity. With reference again to FIGS. 8 and 9, the controller may use the machine's maximum yaw rate to adjust the error slope so that the machine's turn is more gradual and the heading change never exceeds the machine's maximum yaw rate. Embodiments of the present invention may employ both velocity adjustment and error slope adjustment. Embodiments of the invention automatically adjust the error slope to avoid instability while maintaining optimal tracking performance by maintaining the error slope as high as possible without sacrificing stability.

The set heading is defined as $$\frac{\partial \theta_{set}}{\partial t},$$

which (applying the chain rule) is equivalent to:

$$\frac{\partial \theta_{set}}{\partial t} = \frac{\partial \theta_{set}}{\partial d}\frac{\partial d}{\partial t} \quad (14)$$

As the mobile machine is located a distance d from the reference path, according to the control algorithm, the desired set heading for the robot may be computed using:

$$\theta_{set} = \left(\frac{\pi}{2} - \frac{\pi}{2}\tanh(d \times err_{slope})\right) \quad (15)$$

Assuming that the mobile machine can respond immediately and perfectly to changes in the set heading (that is, θ=θset), the distance d changes with time according to:

$$\frac{\partial d}{\partial t} = -v_x \cos \theta_{set} \quad (16)$$

Using equations (14), (15) and (16), the change rate of the set heading over time can be defined as:

$$\frac{\partial \theta_{set}}{\partial t} = \frac{\pi}{2} err_{slope}\left(1 - \tanh^2(d \times err_{slope})\right) \times v_x \cos\left(\frac{\pi}{2} - \frac{\pi}{2}\tanh(d \times err_{slope})\right) \quad (17)$$

Figure 17:
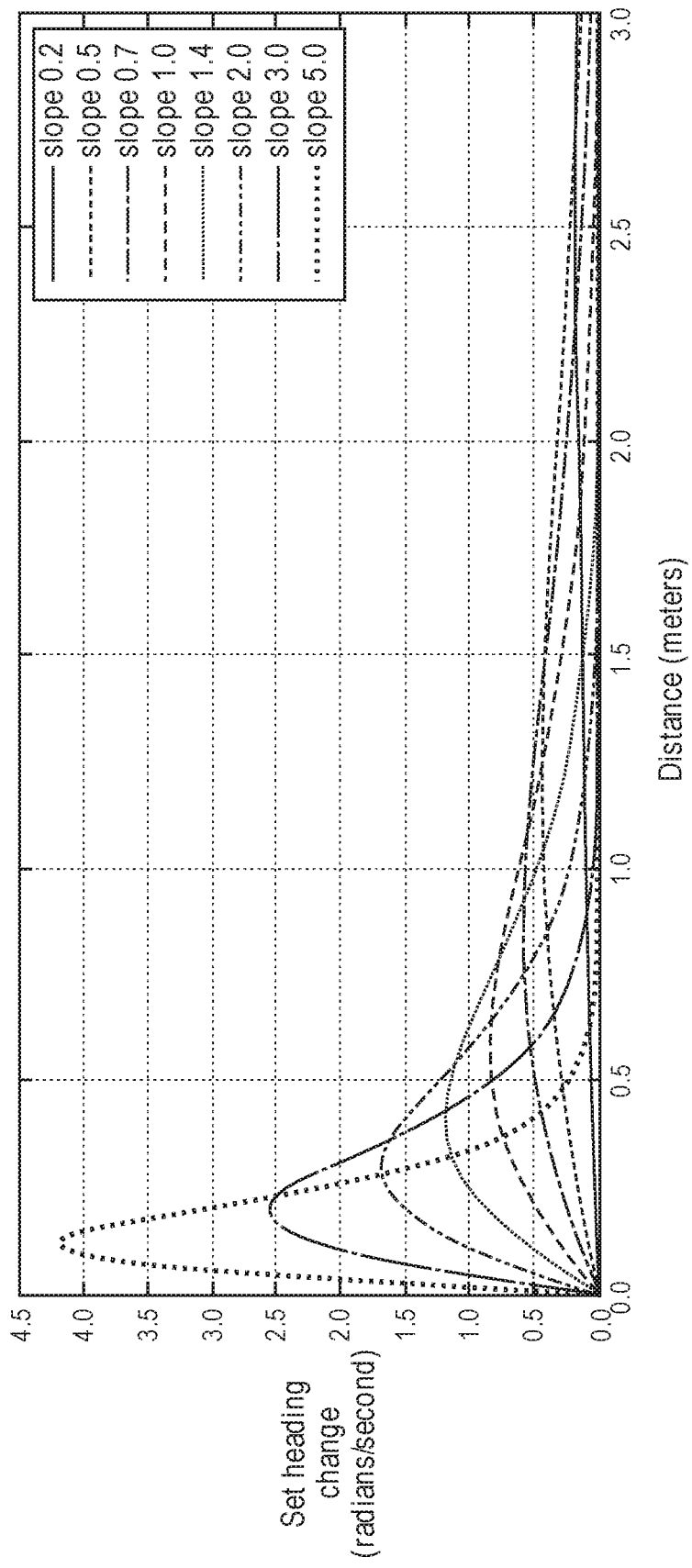
FIG. 17 is a graph illustrating a rate of machine heading change at various distances from the guidance path, at a constant velocity and for different values of the error slope parameter, using a control algorithm in accordance with embodiments of the invention.
Figure 18:
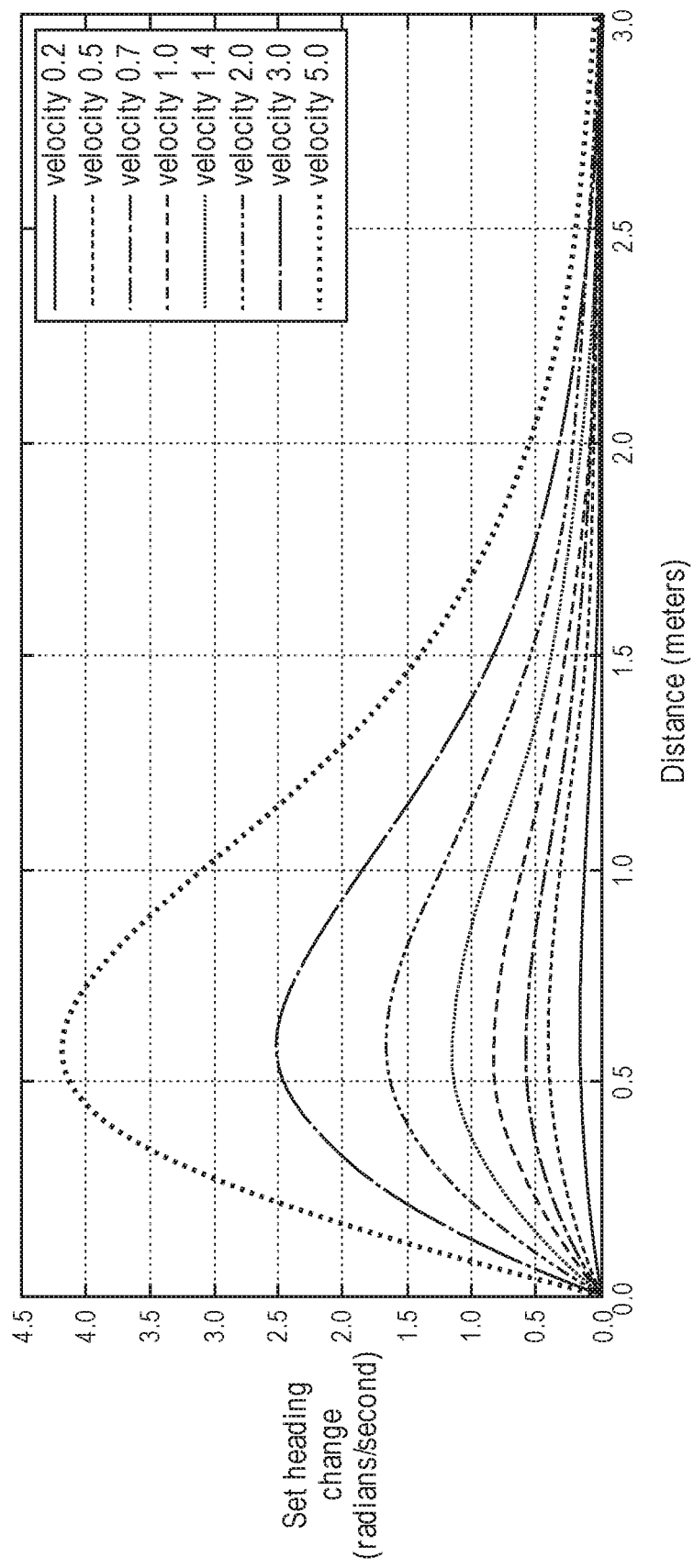
FIG. 18 is a graph illustrating a rate of machine heading change at various distances from the guidance path, for a single error slope parameter and for different velocities, using a control algorithm in accordance with embodiments of the invention.

This function is plotted in FIG. 17 for a constant forward velocity of one meter per second and different values of the error slope ($err_{slope}$), and in FIG. 18 for an error slope of 1.0 and different speeds. FIGS. 17 and 18 illustrate that for each value of the error slope there is a peak rate of change of the machine's heading. The larger the value of the error slope the higher the peak and the closer it is to the reference path.

If the error slope remains constant the controller must use the error slope value with a peak that does not exceed the mobile machine's maximum yaw rate to preserve stability. As can be seen from the graphs depicted in FIG. 17 and FIG. 18, if the peak rate of change is limited to the mobile machine's maximum yaw rate the mobile machine will be operating below its maximum yaw rate for most of the path toward the reference path. This approach would not take full advantage of the mobile machine's turning ability and may not be the most effective approach for balancing stability and accuracy.

Figure 19:
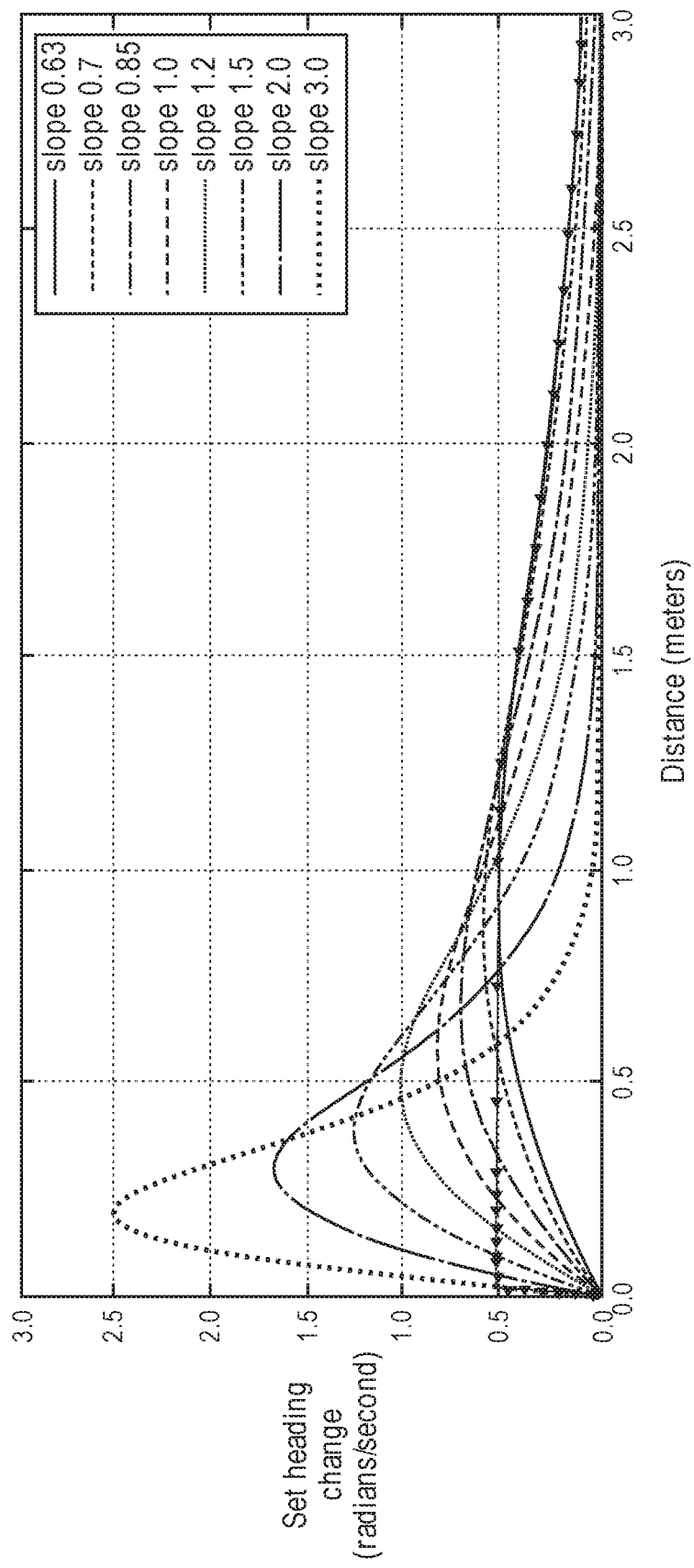
FIG. 19 is a graph illustrating an error slope value adjusted according to a control algorithm for different distances of the machine from the guidance path to preserve stability of the mobile machine.
Figure 20:
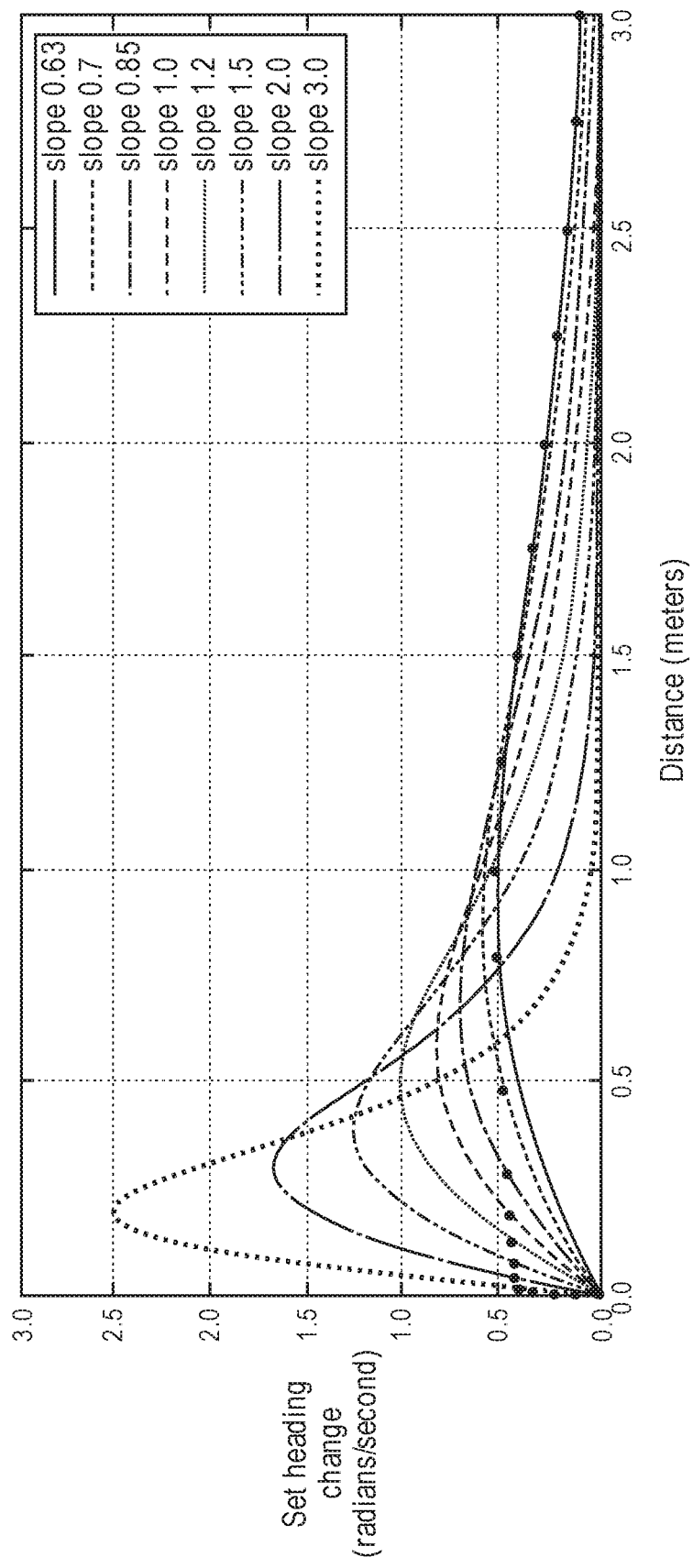
FIG. 20 is a graph illustrating an error slope value adjusted according to a control algorithm for different distances of the machine from the guidance path to preserve stability of the mobile machine.

In some embodiments of the invention the controller makes use of an adaptation algorithm to adjust the error slope to a maximum allowed value after the machine has passed the peak yaw rate and according to the machine's current speed and distance from the reference path. FIG. 19 illustrates the ideal or theoretical error slope value where an initial error slope value of 0.63 is used to determine the set heading until the mobile machine has passed the peak yaw rate for that error slope value (0.84 meters from the reference path), at which time the error slope value is adjusted to maintain the yaw rate at the maximum yaw rate corresponding to the error slope value of 0.63 until the maximum value of the slope is reached. FIG. 20 illustrates actual error slope values calculated by the controller dynamically using the approximations explained herein. This adaptation algorithm allows the mobile machine to reach the reference path as quickly as possible while remaining stable.

The change of set heading may be approximated by equation (18) as follows:

$$\frac{\partial \theta_{set}}{\partial t} \approx \left(-\frac{10}{3}v_x err_{slope}^3\right) \times \left(d - \frac{1}{2err_{slope}}\right)^2 + \left(\frac{5}{6}v_x err_{slope}\right) \quad (18)$$

It should be noted that this approximation may not be accurate for portions of the path not between the point on the path corresponding to the peak yaw rate and the reference path, but that is not a problem here as the approximation is only used for portions of the path corresponding to the point on the path between the peak yaw rate and the reference path. Assuming the maximum yaw rate of the mobile machine (or inner loop) is π/6 radians per second, the maximum error slope may be determined by resolving equation (18) into the error slope according to equation (19) as follows:

$$\frac{10}{3}v_x d^2 err_{slope}^2 - \frac{10}{3}v_x d err_{slope}^2 + \dot{\theta}_{max} = 0 \quad (19)$$

This cubic equation without a linear term can be solved using Cardano's method. A cubic equation of the form $ax^3+bx^2+cx+d=0$ (where $a \neq 0$) always incorporates three real or one real and two complex roots. The general cubic equation is transformed into the reduced cubic equation $y^3+3py+q=0$, with $p=3ac-b^2$ and $q=2b^3-9abc+27a^2d$. The discriminant D is computed as $D=q^2+4p^3$. If D is less than zero there exist three different solutions, and the intermediate sizes are given as follows:

$$y_1 = \sqrt{-p} \times \left(2 \cos\left(\frac{\varphi}{3}\right)\right) \quad (20)$$

$$y_2 = y_3 = \sqrt{-p} \times \left(2 \cos\left(\frac{\varphi}{3} + \frac{4\pi}{3}\right)\right) \quad (21)$$

where $$\varphi = \arccos\left(\frac{-q}{2\sqrt{-p^3}}\right) \quad (22)$$

The solutions to the general cubic equation (19) by retransformation to the following:

$$x_1 = \frac{y_1 - b}{3a} \quad (23)$$

$$x_2 = \frac{y_2 - b}{3a} \quad (24)$$

$$x_3 = \frac{y_3 - b}{3a} \quad (25)$$

As we are concerned only with the path between the peak yaw rate and the reference path, the discriminant D is always less than zero and the desired solution is always $x_3$. Exemplary skeleton computer code for implementing the adaptation algorithm is set forth in Table 2, below. The only input into the adaptation system is the actual distance error relative to the reference path and the forward velocity of the mobile machine 10. The maximum error slope and the maximum yaw rate are predefined.

TABLE 2

```
static float achievable_yawrate = 25.0 * M_PI / 180.0;
float solve_cubic_equation(float yawrate_achievable, float veloc, float distance)
{
    float a = distance;
    float b = − 1.0;
```

TABLE 2-continued

```
        float c = 0.0;
        float d = 3.0*yawrate_achievable/(10.0*veloc*distance);
        float p = 3.0*a*c-pow(b,2);
        float q = 2.0*pow(b,3) - 9.0*a*b*c +27.0*pow(a,2)*d;
        float D = pow(q,2) + 4.0*pow(p,3);
        float phi = acos(-q/(2*sqrt(-pow(p,3))));
        float y_3 = sqrt(-p)*(2*cos(phi/3+4*M_PI/3));
        float x_3 = (y_3-b)/(3*a);
        return x_3;
}
float calculate_adaptive_slope(float yawchange_max, float errslope_max, float vel, float
dist_act)
{
        if (vel < 0.2) {
            return 1.0;
        }
        if (dist_act < 0.001) {
            return errslope_max;
        }
        float err_slope_stable = 6.0 / 5.0 * yawchange_max / vel;
        if (err_slope_stable > errslope_max) {
            return errslope_max;
        }
        float vertex = 1 / (2.0 * err_slope_stable);
        if (dist_act > vertex) {
            return err_slope_stable;
        }
        else {
            float optimated_slope = solve_cubic_equation(yawchange_max,vel,dist_act);
            if (optimated_slope > errslope_max) {
                return errslope_max;
            }
            else {
                return optimated_slope;
            }
        }
}
void slope_adaption(struct thread_data* th_data)
{
        float slope_max = 1.5/th_data->speed_control;
        float slope_adaptive =
        calculate_adaptive_slope(achievable_yawrate,slope_max,th_data->speed_control,
        fabs(th_data->distance_error));
        if (slope_adaptive > 3.0) {
            slope_adaptive = 3.0;
        }
        err_slope = slope_adaptive;
}
```

Although the invention has been described with reference to the preferred embodiment illustrated in the attached drawing figures, it is noted that equivalents may be employed and substitutions made herein without departing from the scope of the invention as recited in the claims. By way of example, while the machine 10 has four wheels including two driven wheels, other configurations are within the ambit of the present invention. The machine 10 may include four driven wheels, or a total of three wheels including two driven wheels and a single caster wheel. In yet another embodiment, the machine 10 may include track assemblies instead of wheels, such as one track assembly on each side for a total of two track assemblies. The machine 10 may be configured to perform any of various different agricultural operations including, without limitation, planting seeds, applying fertilizer and applying pesticide or herbicide.

Having thus described the preferred embodiment of the invention, what is claimed as new and desired to be protected by Letters Patent includes the following:

1. A mobile machine comprising:
   a chassis;
   a plurality of ground-engaging elements for supporting the chassis on a ground surface and propelling the chassis relative to the ground surface, each of the plurality of ground-engaging elements being at a fixed angle relative to the chassis;
   a plurality of actuators for driving movement of the ground-engaging elements, each of the actuators being configured to drive movement of at least one of the ground-engaging elements independently of the other ground-engaging elements; and
   a controller for controlling each of the actuators to cause the mobile machine to follow a reference path, the controller configured to—
   implement a cascading control loop for controlling movement of the mobile machine, the cascading control loop including—
   an outer loop configured to determine a set heading for reducing a distance between the mobile machine and the reference path, the set heading being determined using an error slope parameter, the set heading causing the mobile machine to follow a path with varying radii of curvature, including a portion of the path with a smallest radius of curvature, and
   an inner loop configured to drive the actuators so that the mobile machine follows the set heading determined by the outer loop, and automatically adjust the error slope parameter so that the rate of change of the set heading does not exceed the mobile machine's maximum yaw rate and, after the mobile machine has traversed the portion of the path with the smallest radius of curvature, the set heading change is the lesser of the maximum error slope and the mobile machine's maximum yaw rate as the mobile machine approaches the reference path.

2. The mobile machine as set forth in claim 1, the controller further configured to determine the set heading using only a heading reference value and a distance d of the mobile machine from the reference path.

3. The mobile machine as set forth in claim 2, the controller further configured to determine the set heading by applying a hyperbolic tangent function to the product of the distance d and the error slope parameter.

4. The mobile machine as set forth in claim 1, the error slope parameter determining an angle at which the mobile machine approaches the reference path and a turn radius of the mobile machine as it approaches the reference path.

5. The mobile machine as set forth in claim 1, the controller configured to use a maximum yaw rate of the mobile machine and a current velocity of the mobile machine to automatically adjust the error slope value so that the rate of change of the set heading does not exceed the maximum yaw rate.

\* \* \* \* \*